(12) United States Patent
Podgorny et al.

(10) Patent No.: US 11,423,411 B2
(45) Date of Patent: *Aug. 23, 2022

(54) SEARCH RESULTS BY RECENCY BOOSTING CUSTOMER SUPPORT CONTENT

(71) Applicant: Intuit Inc., Mountain View, CA (US)

(72) Inventors: Igor A. Podgorny, San Diego, CA (US); Benjamin Indyk, San Diego, CA (US); Todd Frey Goodyear, San Diego, CA (US); Irene F. Ma, Carlsbad, CA (US)

(73) Assignee: Intuit Inc., Mountain View, CA (US)

( * ) Notice: Subject to any disclaimer, the term of this patent is extended or adjusted under 35 U.S.C. 154(b) by 296 days.

This patent is subject to a terminal disclaimer.

(21) Appl. No.: 16/731,989

(22) Filed: Dec. 31, 2019

(65) Prior Publication Data

US 2020/0134635 A1    Apr. 30, 2020

Related U.S. Application Data

(63) Continuation of application No. 15/368,806, filed on Dec. 5, 2016, now Pat. No. 10,552,843.

(51) Int. Cl.
*G06F 16/248* (2019.01)
*G06Q 30/00* (2012.01)
(Continued)

(52) U.S. Cl.
CPC ............ *G06Q 30/01* (2013.01); *G06F 16/22* (2019.01); *G06F 16/248* (2019.01); *G06F 16/24578* (2019.01); *H04L 67/306* (2013.01)

(58) Field of Classification Search
CPC ... G06Q 30/01; G06F 16/22; G06F 16/24578; G06F 16/248; H04L 67/306
See application file for complete search history.

(56) References Cited

U.S. PATENT DOCUMENTS 5,471,382 A    11/1995    Tallman et al.
5,519,608 A     5/1996    Kupiec
(Continued)

FOREIGN PATENT DOCUMENTS

AU    2001259223 B2    11/2001
CN      101520802 A     4/2009
(Continued)

OTHER PUBLICATIONS

Negoescu et al., "Modeling Flickr Communities Through Probabilistic Topic-Based Analysis," IEEE Transactions on Multimedia, vol. 12, No. 5, pp. 399-416, Aug. 2010.
(Continued)

*Primary Examiner* — Huawen A Peng
(74) *Attorney, Agent, or Firm* — Paradice and Li LLP

(57) ABSTRACT

Disclosed methods and systems improve search results by recency boosting customer support content for a customer self-help system associated with one or more financial management systems. The customer self-help system retrieves content relevance from a variety of sources, such as media outlets, taxation agencies and news feeds for the financial management system. The customer self-help system generates content relevance weights from the content relevance data, and applies the content relevance weights to customer support content maintained by the customer self-help system. In response to receiving a search query from a user, the customer self-help system provides relevant portions of customer support content that has been recency boosted (e.g., adjusted by the content relevance weights), to increase the likelihood that the customer support content provided to the user is relevant to the user's search query.

20 Claims, 6 Drawing Sheets

(51) Int. Cl.
*H04L 67/306* (2022.01)
*G06F 16/22* (2019.01)
*G06F 16/2457* (2019.01)

(56) References Cited

U.S. PATENT DOCUMENTS

| | | |
|---|---|---|
| 5,701,399 A | 12/1997 | Lee et al. |
| 6,006,218 A | 12/1999 | Breese et al. |
| 6,147,975 A | 11/2000 | Bowman-Amuah |
| 6,256,633 B1 | 7/2001 | Dharap |
| 6,349,307 B1 | 2/2002 | Chen |
| 6,513,036 B2 | 1/2003 | Fruensgaard et al. |
| 6,564,213 B1 | 5/2003 | Ortega et al. |
| 6,601,055 B1 | 7/2003 | Roberts |
| 6,708,172 B1 | 3/2004 | Wong et al. |
| 6,853,982 B2 | 2/2005 | Smith et al. |
| 7,013,263 B1 | 3/2006 | Isaka et al. |
| 7,222,078 B2 | 5/2007 | Abelow |
| 7,385,716 B1 | 6/2008 | Skaanning |
| 7,424,510 B2 | 9/2008 | Gross et al. |
| 7,565,312 B1 | 7/2009 | Shaw et al. |
| 7,587,387 B2 | 9/2009 | Hogue |
| 7,594,176 B1 | 9/2009 | English |
| 7,603,301 B1 | 10/2009 | Regan |
| 7,610,226 B1 | 10/2009 | Miller |
| 7,620,607 B1 | 11/2009 | Ershov |
| 7,627,504 B2 | 12/2009 | Brady et al. |
| 7,685,144 B1 | 3/2010 | Katragadda |
| 7,739,286 B2 | 6/2010 | Sethy et al. |
| 7,747,601 B2 | 6/2010 | Cooper et al. |
| 7,877,402 B1 | 1/2011 | Weiss et al. |
| 7,890,526 B1 | 2/2011 | Brewer et al. |
| 7,966,282 B2 | 6/2011 | Pinckney et al. |
| 7,974,860 B1 | 7/2011 | Travis |
| 8,010,545 B2 | 8/2011 | Stefik et al. |
| 8,019,753 B2 | 9/2011 | Podgorny et al. |
| 8,185,517 B1 | 5/2012 | Wood et al. |
| 8,200,527 B1 | 6/2012 | Thompson et al. |
| 8,209,333 B2 | 6/2012 | Hubbard et al. |
| 8,271,471 B1 | 9/2012 | Kamvar et al. |
| 8,311,792 B1 | 11/2012 | Podgory et al. |
| 8,311,863 B1 | 11/2012 | Kemp |
| 8,341,167 B1 | 12/2012 | Podgorny et al. |
| 8,473,339 B1 | 6/2013 | McKennon et al. |
| 8,478,780 B2 | 7/2013 | Cooper et al. |
| 8,484,228 B2 | 7/2013 | Bhattacharyya et al. |
| 8,631,006 B1 | 1/2014 | Haveliwala et al. |
| 8,645,298 B2 | 2/2014 | Hennig et al. |
| 8,660,849 B2 | 2/2014 | Gruber et al. |
| 8,732,222 B2 | 5/2014 | Horvitz et al. |
| 8,805,734 B2 | 8/2014 | Diana et al. |
| 8,817,968 B1 | 8/2014 | Boutcher et al. |
| 8,850,490 B1 | 9/2014 | Thomas et al. |
| 8,892,539 B2 | 11/2014 | Anand et al. |
| 8,909,568 B1 | 12/2014 | Mann et al. |
| 8,935,192 B1 | 1/2015 | Ventilla et al. |
| 8,943,145 B1 | 1/2015 | Peters et al. |
| 8,972,318 B2 | 3/2015 | Prakash et al. |
| 8,983,977 B2 | 3/2015 | Ishikawa et al. |
| 9,015,031 B2 | 4/2015 | Ferrucci et al. |
| 9,037,578 B2 | 5/2015 | Brust et al. |
| 9,060,062 B1 | 6/2015 | Madahar et al. |
| 9,063,983 B1 | 6/2015 | Lee |
| 9,229,974 B1 | 1/2016 | Lee et al. |
| 9,235,626 B2 | 1/2016 | Liu et al. |
| 9,247,066 B1 | 1/2016 | Stec et al. |
| 9,262,528 B2 | 2/2016 | Cooper et al. |
| 9,336,211 B1 | 5/2016 | Bousquet et al. |
| 9,336,269 B1 | 5/2016 | Smith et al. |
| 9,342,608 B2 | 5/2016 | Cook et al. |
| 9,460,191 B1 | 5/2016 | Gaucher et al. |
| 9,471,883 B2 | 10/2016 | Chatterjee et al. |
| 9,582,757 B1 | 2/2017 | Holmes et al. |
| 9,633,309 B2 | 4/2017 | Giffels et al. |
| 9,747,390 B2 * | 8/2017 | Cooper ............... G06F 40/242 |
| 9,767,169 B1 | 9/2017 | Paff et al. |
| 9,779,388 B1 | 10/2017 | Hansen et al. |
| 9,881,102 B2 | 1/2018 | Gordner et al. |
| 9,887,887 B2 | 2/2018 | Hunter et al. |
| 9,892,367 B2 | 2/2018 | Guo et al. |
| 9,910,886 B2 | 3/2018 | Adams, Jr. et al. |
| 10,002,177 B1 | 6/2018 | McClintock et al. |
| 10,049,664 B1 | 8/2018 | Indyk et al. |
| 10,083,213 B1 | 9/2018 | Podgorny et al. |
| 10,134,050 B1 | 11/2018 | Hung et al. |
| 10,147,037 B1 | 12/2018 | Podgorny et al. |
| 10,162,734 B1 | 12/2018 | Podgorny et al. |
| 10,210,244 B1 | 2/2019 | Branavan et al. |
| 10,354,182 B2 | 7/2019 | Chang et al. |
| 10,460,398 B1 | 10/2019 | Gielow et al. |
| 10,475,044 B1 | 11/2019 | Cannon et al. |
| 10,522,134 B1 | 12/2019 | Matsoukas |
| 10,552,843 B1 | 2/2020 | Podgorny et al. |
| 10,579,625 B2 | 3/2020 | Cho et al. |
| 10,748,157 B1 | 8/2020 | Indyk et al. |
| 10,755,294 B1 | 8/2020 | Podgorny et al. |
| 11,093,951 B1 | 8/2021 | Podgorny et al. |
| 2002/0087387 A1 | 7/2002 | Calver et al. |
| 2002/0111888 A1 | 8/2002 | Stanley et al. |
| 2002/0111926 A1 | 8/2002 | Bebie |
| 2002/0123983 A1 | 9/2002 | Riley et al. |
| 2002/0169595 A1 | 11/2002 | Agichtein et al. |
| 2003/0028448 A1 | 2/2003 | Joseph et al. |
| 2003/0061131 A1 | 3/2003 | Parkan |
| 2003/0099924 A1 | 5/2003 | Tsuboi et al. |
| 2003/0101161 A1 | 5/2003 | Ferguson et al. |
| 2003/0115318 A1 | 6/2003 | Wueste |
| 2003/0144873 A1 | 7/2003 | Keshel |
| 2004/0024739 A1 | 2/2004 | Copperman et al. |
| 2004/0034652 A1 | 2/2004 | Hofmann et al. |
| 2004/0064442 A1 | 4/2004 | Popovitch |
| 2005/0086290 A1 | 4/2005 | Joyce et al. |
| 2005/0114327 A1 | 5/2005 | Kumamoto et al. |
| 2005/0137939 A1 | 6/2005 | Calabria et al. |
| 2005/0222989 A1 | 10/2005 | Haveliwala et al. |
| 2005/0246314 A1 | 11/2005 | Eder |
| 2006/0064322 A1 | 3/2006 | Mascarenhas et al. |
| 2006/0074788 A1 | 4/2006 | Grizack et al. |
| 2006/0085255 A1 | 4/2006 | Hastings et al. |
| 2006/0085750 A1 | 4/2006 | Easton et al. |
| 2006/0253578 A1 | 11/2006 | Dixon et al. |
| 2006/0265232 A1 | 11/2006 | Katariya et al. |
| 2007/0011131 A1 | 1/2007 | Delefevre |
| 2007/0143262 A1 | 6/2007 | Kasperski |
| 2007/0192166 A1 | 8/2007 | Van Luchene |
| 2007/0192168 A1 | 8/2007 | Van Luchene |
| 2007/0192179 A1 | 8/2007 | Van Luchene |
| 2007/0219863 A1 | 9/2007 | Park et al. |
| 2007/0244900 A1 | 10/2007 | Hopkins et al. |
| 2007/0259325 A1 | 11/2007 | Clapper |
| 2007/0291739 A1 | 12/2007 | Sullivan et al. |
| 2007/0294195 A1 | 12/2007 | Curry et al. |
| 2008/0189197 A1 | 8/2008 | Allanson et al. |
| 2008/0201413 A1 | 8/2008 | Sullivan et al. |
| 2008/0208610 A1 | 8/2008 | Thomas et al. |
| 2008/0214151 A1 | 9/2008 | Ramer et al. |
| 2008/0215541 A1 | 9/2008 | Li et al. |
| 2008/0248815 A1 | 10/2008 | Busch |
| 2008/0294637 A1 | 11/2008 | Liu |
| 2009/0012926 A1 | 1/2009 | Ishikawa et al. |
| 2009/0077047 A1 | 3/2009 | Cooper et al. |
| 2009/0089286 A1 | 4/2009 | Kumar et al. |
| 2009/0106224 A1 | 4/2009 | Roulland et al. |
| 2009/0119575 A1 | 5/2009 | Velusamy |
| 2009/0158143 A1 | 6/2009 | Arav |
| 2009/0162824 A1 | 6/2009 | Heck |
| 2009/0198667 A1 | 8/2009 | Groeneveld et al. |
| 2009/0248659 A1 | 10/2009 | McCool et al. |
| 2009/0253112 A1 | 10/2009 | Cao et al. |
| 2009/0259642 A1 | 10/2009 | Cao et al. |
| 2009/0265340 A1 | 10/2009 | Barcklay et al. |
| 2009/0292609 A1 | 11/2009 | Vaidyanathan |
| 2010/0068687 A1 | 3/2010 | Bertelsen |
| 2010/0070554 A1 | 3/2010 | Richardson et al. |

(56) References Cited

U.S. PATENT DOCUMENTS

| | | |
|---|---|---|
| 2010/0076847 A1 | 3/2010 | Heller |
| 2010/0076998 A1 | 3/2010 | Podgorny et al. |
| 2010/0082649 A1 | 4/2010 | Gutt et al. |
| 2010/0088262 A1 | 4/2010 | Visel et al. |
| 2010/0125781 A1 | 5/2010 | Gadacz |
| 2010/0017388 A1 | 6/2010 | Glover |
| 2010/0138451 A1 | 6/2010 | Henkin et al. |
| 2010/0185630 A1 | 7/2010 | Cheng et al. |
| 2010/0191686 A1 | 7/2010 | Wang et al. |
| 2010/0203492 A1 | 8/2010 | Nibe et al. |
| 2010/0205180 A1 | 8/2010 | Cooper et al. |
| 2010/0205550 A1 | 8/2010 | Chen et al. |
| 2010/0228744 A1 | 9/2010 | Craswell et al. |
| 2010/0235361 A1 | 9/2010 | Chandran et al. |
| 2010/0241507 A1 | 9/2010 | Quinn et al. |
| 2010/0241971 A1 | 9/2010 | Zuber |
| 2010/0318919 A1 | 12/2010 | Murphy et al. |
| 2011/0055110 A1 | 3/2011 | Kolyvanov et al. |
| 2011/0055699 A1 | 3/2011 | Li et al. |
| 2011/0071997 A1 | 3/2011 | Sullivan et al. |
| 2011/0106743 A1 | 5/2011 | Duchon |
| 2011/0106895 A1 | 5/2011 | Ventilla et al. |
| 2011/0125734 A1 | 5/2011 | Duboue et al. |
| 2011/0202472 A1 | 8/2011 | Wan et al. |
| 2011/0231347 A1 | 9/2011 | Xu et al. |
| 2011/0246334 A1 | 10/2011 | Schoenberg et al. |
| 2011/0264569 A1 | 10/2011 | Houseworth et al. |
| 2011/0282892 A1 | 11/2011 | Castellani et al. |
| 2011/0295612 A1 | 12/2011 | Donneau-Golencer et al. |
| 2012/0005148 A1 | 1/2012 | Horvitz et al. |
| 2012/0005219 A1 | 1/2012 | Apacible et al. |
| 2012/0022983 A1 | 1/2012 | Hughes et al. |
| 2012/0030079 A1 | 2/2012 | Slater et al. |
| 2012/0036053 A1 | 2/2012 | Miller |
| 2012/0077178 A1 | 3/2012 | Bagchi et al. |
| 2012/0084120 A1 | 4/2012 | Hirson et al. |
| 2012/0084185 A1 | 4/2012 | Ciaramitaro et al. |
| 2012/0084279 A1 | 4/2012 | Driscoll et al. |
| 2012/0084293 A1 | 4/2012 | Brown et al. |
| 2012/0095976 A1 | 4/2012 | Hebenthal et al. |
| 2012/0101965 A1 | 4/2012 | Hennig et al. |
| 2012/0130910 A1 | 5/2012 | Al-Alami |
| 2012/0130978 A1 | 5/2012 | Li et al. |
| 2012/0136764 A1 | 5/2012 | Miller et al. |
| 2012/0150861 A1 | 6/2012 | Thione et al. |
| 2012/0166438 A1 | 6/2012 | Wu et al. |
| 2012/0219142 A1 | 8/2012 | Gould |
| 2012/0221557 A1 | 8/2012 | Edmonds et al. |
| 2012/0233191 A1 | 9/2012 | Ramanujam |
| 2012/0331052 A1 | 12/2012 | Rathod |
| 2013/0006914 A1 | 1/2013 | Ray et al. |
| 2013/0019286 A1 | 1/2013 | Barborak et al. |
| 2013/0024290 A1 | 1/2013 | Berg et al. |
| 2013/0054497 A1 | 2/2013 | Gatland et al. |
| 2013/0066693 A1 | 3/2013 | Laird-McConnell et al. |
| 2013/0073387 A1 | 3/2013 | Heath |
| 2013/0073390 A1 | 3/2013 | Konig et al. |
| 2013/0103493 A1 | 4/2013 | Gao et al. |
| 2013/0110671 A1 | 5/2013 | Gray |
| 2013/0110823 A1 | 5/2013 | Su et al. |
| 2013/0111323 A1 | 5/2013 | Taghaddos et al. |
| 2013/0117677 A1 | 5/2013 | St. Jacques, Jr. |
| 2013/0124449 A1 | 5/2013 | Pinckney et al. |
| 2013/0159233 A1 | 6/2013 | Mason et al. |
| 2013/0204876 A1 | 8/2013 | Szucs et al. |
| 2013/0224713 A1 | 8/2013 | Ajmera et al. |
| 2013/0268319 A1 | 10/2013 | Palombo |
| 2013/0275408 A1 | 10/2013 | Rodriguez et al. |
| 2013/0282363 A1 | 10/2013 | Fan et al. |
| 2013/0285855 A1 | 10/2013 | Dupray et al. |
| 2013/0297545 A1 | 11/2013 | Bierner et al. |
| 2013/0297553 A1 | 11/2013 | Bierner |
| 2013/0297625 A1 | 11/2013 | Bierner et al. |
| 2013/0304730 A1 | 11/2013 | Zhou |
| 2013/0325992 A1 | 12/2013 | McGann et al. |
| 2013/0339870 A1 | 12/2013 | Tandra Sishtla et al. |
| 2014/0006012 A1 | 1/2014 | Zhou et al. |
| 2014/0022323 A1 | 1/2014 | Gechter et al. |
| 2014/0052496 A1 | 2/2014 | Diana et al. |
| 2014/0052606 A1 | 2/2014 | Vasudevan et al. |
| 2014/0052716 A1 | 2/2014 | Chakra et al. |
| 2014/0075004 A1 | 3/2014 | Van Dusen et al. |
| 2014/0088944 A1 | 3/2014 | Natarajan et al. |
| 2014/0114822 A1 | 4/2014 | Sharma et al. |
| 2014/0119531 A1 | 5/2014 | Tuchman et al. |
| 2014/0172883 A1 | 6/2014 | Clark et al. |
| 2014/0181652 A1 | 6/2014 | Stanke et al. |
| 2014/0189829 A1 | 7/2014 | McLachlan et al. |
| 2014/0195613 A1 | 7/2014 | Ogilvie |
| 2014/0201045 A1 | 7/2014 | Pai et al. |
| 2014/0222669 A1 | 8/2014 | Novak et al. |
| 2014/0244528 A1 | 8/2014 | Zhang et al. |
| 2014/0280055 A1 | 9/2014 | Chang et al. |
| 2014/0280070 A1 | 9/2014 | George et al. |
| 2014/0297268 A1 | 10/2014 | Govrin et al. |
| 2014/0308643 A1 | 10/2014 | Jain |
| 2014/0316856 A1 | 10/2014 | Williams et al. |
| 2014/0324856 A1 | 10/2014 | Lahiani et al. |
| 2014/0337257 A1 | 11/2014 | Chatterjee et al. |
| 2014/0372980 A1 | 12/2014 | Verma et al. |
| 2015/0006344 A1 | 1/2015 | Saimani et al. |
| 2015/0052087 A1 | 2/2015 | Srinivasan et al. |
| 2015/0058380 A1 | 2/2015 | Polonsky et al. |
| 2015/0088608 A1 | 3/2015 | Cama et al. |
| 2015/0095267 A1 | 4/2015 | Behere et al. |
| 2015/0120718 A1 | 4/2015 | Luo et al. |
| 2015/0127587 A1 | 5/2015 | Pinckney et al. |
| 2015/0139415 A1 | 5/2015 | Skiba et al. |
| 2015/0170049 A1 | 6/2015 | Mann et al. |
| 2015/0213021 A1 | 7/2015 | He et al. |
| 2015/0229531 A1 | 8/2015 | O'Sullivan et al. |
| 2015/0242906 A1 | 8/2015 | Liu et al. |
| 2015/0254785 A1 | 9/2015 | Yang et al. |
| 2015/0278241 A1 | 10/2015 | Bates-Haus et al. |
| 2015/0317197 A1 | 11/2015 | Biair |
| 2015/0317449 A1 | 11/2015 | Eder |
| 2015/0324367 A1 | 11/2015 | Aravamudan et al. |
| 2015/0324805 A1 | 11/2015 | Skiba et al. |
| 2015/0363481 A1 | 12/2015 | Haynes |
| 2015/0371137 A1 | 12/2015 | Giffels et al. |
| 2016/0048772 A1 | 2/2016 | Bruno et al. |
| 2016/0055234 A1 | 2/2016 | Visotski et al. |
| 2016/0062980 A1 | 3/2016 | Boguraev et al. |
| 2016/0078567 A1 | 3/2016 | Goldman et al. |
| 2016/0103833 A1 | 4/2016 | Sanders et al. |
| 2016/0147760 A1 | 5/2016 | N et al. |
| 2016/0148222 A1 | 5/2016 | Davar et al. |
| 2016/0148321 A1 | 5/2016 | Ciaramitaro et al. |
| 2016/0154856 A1 | 6/2016 | Olof-Ors et al. |
| 2016/0179816 A1 | 6/2016 | Glover |
| 2016/0180470 A1 | 6/2016 | Mascaro et al. |
| 2016/0188731 A1 | 6/2016 | Dai et al. |
| 2016/0189029 A1 | 6/2016 | Giffels et al. |
| 2016/0196497 A1 | 7/2016 | Allen et al. |
| 2016/0203523 A1 | 7/2016 | Spasojevic et al. |
| 2016/0217472 A1 | 7/2016 | Podgorny et al. |
| 2016/0247165 A1 | 8/2016 | Ryabchun et al. |
| 2016/0259844 A1* | 9/2016 | Trapeznikov ......... G06F 16/285 |
| 2016/0283491 A1 | 9/2016 | Lu et al. |
| 2016/0306846 A1 | 10/2016 | Adams, Jr. et al. |
| 2016/0371276 A1 | 12/2016 | Furtado et al. |
| 2017/0011352 A1 | 1/2017 | Jones-McFadden et al. |
| 2017/0017899 A1 | 1/2017 | Maor et al. |
| 2017/0024424 A1 | 1/2017 | Almohizea |
| 2017/0032251 A1 | 2/2017 | Podgorny et al. |
| 2017/0032463 A1 | 2/2017 | Wang et al. |
| 2017/0046623 A1 | 2/2017 | Murdock et al. |
| 2017/0053026 A1 | 2/2017 | Musuluri et al. |
| 2017/0124184 A1 | 5/2017 | Podgorny et al. |
| 2017/0213130 A1 | 7/2017 | Khatri et al. |
| 2017/0228459 A1 | 8/2017 | Wang et al. |
| 2017/0235848 A1* | 8/2017 | Van Dusen ............ G06N 20/00 705/12 |
| 2017/0262529 A1 | 9/2017 | Chim et al. |

(56) References Cited

U.S. PATENT DOCUMENTS

| | | |
|---|---|---|
| 2017/0262900 A1 | 9/2017 | Ramachandran et al. |
| 2017/0270159 A1 | 9/2017 | Wang et al. |
| 2017/0308613 A1 | 10/2017 | Zhu et al. |
| 2017/0323233 A1 | 11/2017 | Bencke et al. |
| 2018/0032523 A1 | 2/2018 | Singhal et al. |
| 2018/0032607 A1 | 2/2018 | Singhal et al. |
| 2018/0032890 A1 | 2/2018 | Podgorny et al. |
| 2018/0089283 A1 | 3/2018 | Indyk et al. |
| 2018/0108092 A1 | 4/2018 | Goodyear et al. |
| 2018/0108093 A1 | 4/2018 | Podgorny et al. |
| 2018/0113935 A1 | 4/2018 | George et al. |
| 2018/0121550 A1 | 5/2018 | Jeon et al. |
| 2018/0137203 A1 | 5/2018 | Hennekey et al. |
| 2018/0165758 A1 | 6/2018 | Saxena et al. |
| 2018/0174055 A1 | 6/2018 | Tirumale et al. |
| 2018/0189292 A1 | 7/2018 | Grace, Jr. et al. |
| 2018/0196796 A1 | 7/2018 | Wu |
| 2018/0204106 A1 | 7/2018 | Beller et al. |
| 2018/0287968 A1 | 10/2018 | Koukoumidis et al. |
| 2018/0321951 A1 | 11/2018 | Fitzgerald et al. |
| 2019/0018692 A1 | 1/2019 | Indyk et al. |
| 2019/0018899 A1 | 1/2019 | Podgorny et al. |
| 2019/0065576 A1 | 2/2019 | Peng et al. |
| 2019/0103035 A1 | 4/2019 | Beller et al. |
| 2020/0027095 A1 | 1/2020 | Cannon et al. |
| 2020/0134738 A1 | 4/2020 | Goodyear et al. |
| 2020/0327622 A1 | 10/2020 | Podgorny et al. |
| 2020/0357009 A1 | 11/2020 | Podgorny et al. |

FOREIGN PATENT DOCUMENTS

| | | |
|---|---|---|
| EP | 2159715 A2 | 3/2010 |
| JP | 2014112316 A | 6/2014 |
| WO | 2001082202 A2 | 11/2001 |
| WO | WO2011/053830 A2 | 5/2011 |

OTHER PUBLICATIONS

Blei et al., "Latent Dirichlet Allocation," Journal of Machine Learning Research 3, Jan. 2003, pp. 993-1022.

Blei et al., "Probablilistic Topic Models," Communications of the ACM, Apr. 2012, vol. 55, No. 4, pp. 77-84.

Dror et al., "From Query to Question in One Click: Suggesting Synthetic Questions to Searchers," International World Wide Web Conferences Steering Committee, May 13, 2013, pp. 391-401.

Encyclopedia Britannica, "Graphical User interface (GUI)," Sep. 5, 2015. Retrieved from the internet <URL: http://www.britannica.com/technology/graphical-user-interface>, 3 pages.

Fitchett et al., "An Empirical Characterisation of File Retrieval," Oct. 3, 2014, University of Canterbury, Christchurch, New Zealand, Int. J. Human-Computer Studies 74 (2015), pp. 1-13 (Year: 2014).

Get Satisfaction [online]. Sprinklr, 2017 [retrieved on Nov. 22, 2017], Retrieved from the Internet: <URL: https://getsatisfaction.com/corp>, 5 pages.

Grant et al., "The Human Face of Crowdsourcing: A Citizen-led Crowdsourcing Case Study," 2013 IEEE International Conference on Big Data, Silicon Valley, CA 2013, pp. 21-24.

Han et al., "Understanding and Supporting Cross-Device Web Search for Exploratory Tasks with Mobile Touch Interactions," Apr. 2015, ACM Transactions on Information System, vol. 33, No. 4, pp. 1-35, (Year: 2015).

Kumar et al., "Personalized Web search Using Browsing History and Domain Knowledge" International Conference on Issues and Challenges in Intelligent Computing Techniques (ICICT), IEEE 2014, pp. 493-497.

Mimno et al., "Sparse Stochastic Inference for Latent Dirichlet Allocation," Proceedings of the 29th International Conference on Machine Learning, Edinburgh, Scotland, UK, 2012, 8-pages.

Podgorny et al., "Content Qualify and User Ranking in Turbo Tax AnswerXchange," Proceedings of the European Conference on Social Media, University of Brighton UK, Jul. 10-11, 2014, pp. 757-762.

Podgorny et al., "Real-Time Detection and Intervention of Poorly Phrased Questions," CHI EA '15, Proceedings of the 33rd Annual ACM Conference Extended Abstracts on Human Factors in Computing Systems, April 18-23, Seoul, Republic of Korea, pp. 2205-2210.

Steyvers et al., "Proabilistic Author—Topic Models for Information Discovery," KDD'04, Aug. 22-25, 2004, 10 pages.

The Scientific Marketer, "Uplift Modelling FAQ," article date of Sep. 27, 2007, retrieved from http://scientificmarketer.com/2007/09/uplift-modelling-faq.html (Year: 2007), 2 pages.

Wen et al., "Clustering user Queries of a Search Engine," Proceedings of the 10th International Conference on World Wide Web, pp. 162-168, ACM, 2001 (Year: 2001).

Wikipedia "Widget (GUI)," Sep. 7, 2016. Retrieved from the internet <URL: https://en.wikipedia.org/windex.phy?title=Widget_(GUI)&oldid=73B206274>, pp. 1-5.

Zadeh, "Probabilistic Modeling in Communite-Based Question Answering Services," Dalhousie University, Halifax, Nova Soctia; Feb. 2012, 74 pages.

Bartolome et al., "Processing Unstructured Voice of Customer Feedback for Improving Content Rankings in Customer Support," U.S. Appl. No. 15/094,653, filed Apr. 8, 2016.

Wikipedia, "Incremental Search," Jul. 22, 2016. Retrieved from the internet on Mar. 11, 2020 <URL: https://en.wikipedia.org/w/index.php?title=incremental_search&oldid=731052532>, 5 pages (Year 2016).

Ponzanelli et al., "Understanding and Classifying the Quality of Technical Forum Questions," IEEE, 14th International Conference on Quality Software, pp. 343-352 (Year: 2014).

Garg et al., "Mining Top Issues from Contact Center Logs for Self Help Portals," 2008 IEEE International Conference on Services Computing, pp. 171-178, Jul. 2008.

McGee, Google Instant Search: The Complete User's Guide, Sep. 8, 2010, <URL: https://searchengineland.com/google-instant-complete-users-guide-50136>, retrieved Jul. 19, 2021, 11-pages.

Zolaktaf Zadeh, "Probabilistic Modeling in Community-Based Question Answering Services," Dalhousie University, Halifax, NS, Canada, pp. 1-62, Feb. 29, 2012, retrieved from internet on Dec. 17, 2020 at https://dalspace.library.dal.ca/handle/10222/14584.

\* cited by examiner

SEARCH RESULTS BY RECENCY BOOSTING CUSTOMER SUPPORT CONTENT

CROSS-REFERENCE TO RELATED APPLICATIONS

This application is a continuation application of and claims priority to co-pending and commonly-owned U.S. patent application Ser. No. 15/368,806 entitled "METHOD AND SYSTEM FOR IMPROVING SEARCH RESULTS BY RECENCY BOOSTING CUSTOMER SUPPORT CONTENT FOR A CUSTOMER SELF-HELP SYSTEM ASSOCIATED WITH ONE OR MORE FINANCIAL MANAGEMENT SYSTEMS" filed on Dec. 5, 2016, now U.S. Pat. No. 10,552,843, which is hereby incorporated by reference in its entirety

BACKGROUND

A customer self-help system is a system that supports or accompanies one or more other software systems by helping users of the one or more other software systems find answers to their questions, without involving live customer support personnel. If a customer self-help system adequately helps a user find a satisfactory answer to the user's question, the user is less likely to seek addition support from live customer support (e.g., telephone support, live chat, text message, etc.). A business benefit of a well-functioning customer self-help system is reduced overhead costs for a company because providing live customer support can be expensive (e.g., sometimes costing as much as $25 per use of the live customer support). A user benefit of a well-functioning customer self-help system is that users can find answers to their questions more quickly than having to wait for live customer support because use of live customer support usually involves waiting in a queue for a turn to communicate with a customer support representative.

Traditional customer self-help systems use content searching methods that employ content prioritization techniques. In some cases, these prior art prioritization techniques inadequately match available customer support content with user search queries. In particular, traditional customer self-help systems prioritize the relevance of customer support content based on the creation date (e.g., file creation date) of the customer support content. Consequently, newer customer support content (e.g., user experience pages) are prioritized over older customer support content. While this approach could be used to prioritize some customer support content (e.g., product features), such an approach is less appropriate for customer support content that does not change very often (e.g., tax laws or regulations). In other words, such an approach might de-prioritize customer support content that is the most relevant to a search query because the age of the customer support content is older than newer customer support content, leading to search results that are not relevant or most relevant to a user's search query.

A problem with failing to provide users with information that is relevant or most relevant to their search query is that the customer self-help system may appear useless, e.g., be irrelevant, to the users. If a user enters a search query and does not obtain search results that are expected or that answer the user's question, then the user may continue to feel concerned about one or more aspects of the financial management system that led the user to submitting a search query in the first place. A natural result is that the user will lose trust in the customer self-help system and possibly in any financial management systems associated with the customer self-help system.

Another problem with failing to provide users with information that is relevant or most relevant to their search query is that the customer self-help system may fail to capitalize on becoming a trusted source of information for users. For example, if a media outlet (e.g., AARP®, CNN®, Financial Times®, etc.) makes an announcement that is related to obtaining a particular financial advantage (e.g., based on a change to tax laws), users who search a customer self-help system for more information about the announcement may recognize the customer self-help system as a trusted source of information. However, users who receive search results that appear to be oblivious to the announcement may be disappointed and look elsewhere for guidance, both for the current situation and for future issues.

Another problem associated with failing to provide users with information that is relevant or most relevant to their search query is that the customer self-help system may be providing users with the faulty (e.g., out-dated) instructions. For example, if a customer self-help system provides a user with information on how to address a particular product error, even though the product error has been resolved, then the user is essentially being instructed to perform one or more unnecessary steps to address a problem that is no longer relevant.

Traditional content searching techniques include associating the relevance of searchable customer support content with the age of customer support content, but the age of the customer support content is not necessarily the dominant characteristic that determines whether the customer support content is relevant or highly relevant at a given point in time. Thus, a technical problem that exists for customer self-help systems and search engines is a need to avoid providing less-relevant or irrelevant search results due to poor prioritization of customer support content.

SUMMARY

The present disclosure includes embodiments for increasing the likelihood of returning relevant search results to a user by recency boosting customer support content for a customer self-help system associated with one or more financial management systems. Recency boosting generally relates to increasing or decreasing a priority, ranking, or otherwise metricized relevance of customer support content that is managed or hosted by the customer self-help system, according to one embodiment. The customer self-help system recency boosts the customer support content by gathering and using content relevance data from a variety of sources, according to one embodiment. The customer self-help system uses the content relevance data to generate content relevance weights that are applied to the customer support content to increase or decrease the relevance of the customer support content, according to one embodiment. By recency boosting the customer support content, the customer self-help system increases the likelihood of providing relevant search results to a user, decreases the likelihood of providing out-dated or needless instructions to a user, and increases the likelihood of establishing the customer self-help system as a trusted source of information for the user, according to one embodiment. Consequently, embodiments of the disclosed customer self-help system include one or more technical solutions to the technical problem of providing less-relevant or irrelevant search results due to poor prioritization of customer support content, according to one embodiment.

Improving search results by recency boosting customer support content for a customer self-help system associated with one or more financial management systems is a technical solution to a long standing technical problem of providing irrelevant search results to users, and is not an abstract idea for at least a few reasons. First, improving search results by recency boosting customer support content for a customer self-help system associated with one or more financial management systems is not an abstract idea because it is not merely an idea itself (e.g., can be performed mentally or using pen and paper). Second, improving search results by recency boosting customer support content for a customer self-help system associated with one or more financial management systems is not an abstract idea because it is not a fundamental economic practice (e.g., is not merely creating a contractual relationship, hedging, mitigating a settlement risk, etc.). Third, improving search results by recency boosting customer support content for a customer self-help system associated with one or more financial management systems is not an abstract idea because it is not a method of organizing human activity (e.g., managing a game of bingo). Fourth, although mathematics may be used to generate an analytics model, the disclosed and claimed methods and systems of improving search results by recency boosting customer support content for a customer self-help system associated with one or more financial management systems are not an abstract idea because the methods and systems are not simply a mathematical relationship/formula but are instead techniques for transforming customer support content into data that is more likely to satisfy user search queries.

Further, improving search results by recency boosting customer support content for a customer self-help system associated with one or more financial management systems is not an abstract idea because the disclosed recency boosting allows for significant improvement to the technical fields of user experience, self-help systems, customer service, customer retention, financial management systems, and domain-specific search engines, according to one embodiment. The present disclosure adds significantly to the field of content searching because the disclosed customer self-help system: increases the likelihood that a user will receive an answer to the user's intended question; increases the likelihood of improving/maintaining a user's trust in the financial management system; and reduces the amount of time users spend searching for customer support content that is relevant to the user's search query, according to one embodiment.

As a result, embodiments of the present disclosure allow for reduced use of processor cycles, memory, and power consumption, by reducing the time spent by users searching for answers among search results and by reducing time spent by users to repeatedly search for an answer to their question in computing environments, according to one embodiment. Consequently, computing and communication systems implementing or providing the embodiments of the present disclosure are transformed into more operationally efficient devices and systems.

In addition to improving overall computing performance, improving search results by recency boosting customer support content for a customer self-help system associated with one or more financial management systems significantly improves the field of financial management systems, by reducing the amount of time it takes to progress a user through financial management tasks (e.g., preparing a tax return) due to delays caused by users' unanswered questions, according to one embodiment. Furthermore, by improving search results by recency boosting customer support content for a customer self-help system associated with one or more financial management systems, the disclosed embodiments help maintain or build trust and therefore loyalty in the financial management system with which the customer self-help system is associated, which results in repeat customers, efficient delivery of financial services, and reduced abandonment of use of the financial management system, according to one embodiment.

Figure 1:
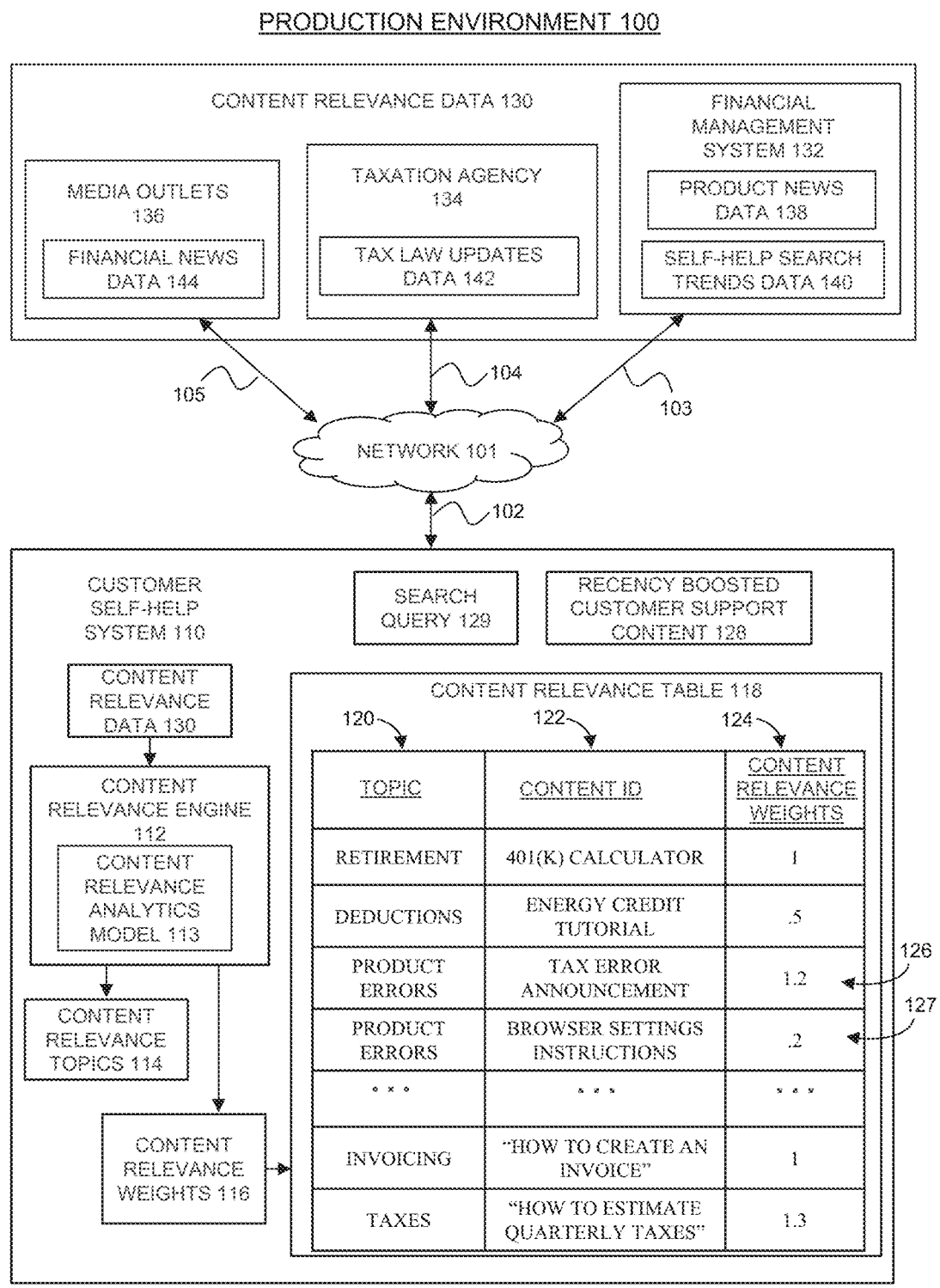
FIG. 1 is a block diagram of an architecture for improving search results by recency boosting customer support content for a customer self-help system associated with one or more financial management systems, in accordance with one embodiment.

Common reference numerals are used throughout the FIGs. and the detailed description to indicate like elements. One skilled in the art will readily recognize that the above FIGs. are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGs., which depict one or more exemplary embodiments. Embodiments may be implemented in many different forms and should not be construed as limited to the embodiments set forth herein, shown in the FIGs., or described below. Rather, these exemplary embodiments are provided to allow a complete disclosure that conveys the principles of the invention, as set forth in the claims, to those of skill in the art.

The INTRODUCTORY SYSTEM, ARCHITECTURE, and PROCESS sections herein describe systems and processes suitable for improving search results by recency boosting customer support content for a customer self-help system associated with one or more financial management systems, according to various embodiments.

Introductory System

The present disclosure includes embodiments for increasing the likelihood of returning relevant search results to a user by recency boosting customer support content for a customer self-help system associated with one or more financial management systems. Recency boosting generally relates to increasing or decreasing a priority, ranking, or otherwise metricized relevance of customer support content that is managed or hosted by the customer self-help system, according to one embodiment. The customer self-help system recency boosts the customer support content by gathering and using content relevance data from a variety of sources, according to one embodiment. The customer self-help system uses the content relevance data to generate content relevance weights that are applied to the customer support content to increase or decrease the relevance of the customer support content, according to one embodiment. By recency boosting the customer support content, the customer self-help system increases the likelihood of providing relevant search results to a user, decreases the likelihood of providing out-dated or needless instructions to a user, and increases the likelihood of establishing the customer self-help system as a trusted source of information for the user, according to one embodiment. Consequently, embodiments of the disclosed customer self-help system include one or more technical solutions to the technical problem of providing less-relevant or irrelevant search results due to poor prioritization of customer support content, according to one embodiment.

As used herein, the term data management system (e.g., customer self-help system, tax return preparation system, or other software system) includes, but is not limited to the following: one or more of computing system implemented, online, web-based personal and business tax return preparation system; one or more of computing system implemented, online, web-based personal or business financial management systems, services, packages, programs, modules, or applications; one or more of computing system implemented, online, and web-based personal or business management systems, services, packages, programs, modules, or applications; one or more of computing system implemented, online, and web-based personal or business accounting or invoicing systems, services, packages, programs, modules, or applications; and various other personal or business electronic data management systems, services, packages, programs, modules, or applications, whether known at the time of filling or as developed after the time of filing.

Specific examples of data management systems include financial management systems. Examples of financial management systems include, but are not limited to the following: TurboTax® available from Intuit, Inc. of Mountain View, Calif.; TurboTax® Online™ available from Intuit, Inc. of Mountain View, Calif.; QuickBooks®, available from Intuit, Inc. of Mountain View, Calif.; QuickBooks® Online™, available from Intuit, Inc. of Mountain View, Calif.; Mint®, available from Intuit, Inc. of Mountain View, Calif.; Mint® Online, available from Intuit, Inc. of Mountain View, Calif.; or various other systems discussed herein, or known to those of skill in the art at the time of filing, or as developed after the time of filing.

As used herein, the terms "computing system," "computing device," and "computing entity," include, but are not limited to, the following: a server computing system; a workstation; a desktop computing system; a mobile computing system, including, but not limited to, one or more of smart phones, portable devices, and devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes or operations as described herein.

In addition, as used herein, the terms "computing system", "computing entity", and "computing environment" can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes or operations as described herein.

Herein, the term "production environment" includes the various components, or assets, used to deploy, implement, access, and use, a given system as that system is intended to be used. In various embodiments, production environments include multiple computing systems or assets that are combined, communicatively coupled, virtually or physically connected, or associated with one another, to provide the production environment implementing the application.

As specific illustrative examples, the assets making up a given production environment can include, but are not limited to, the following: one or more computing environments used to implement at least part of a system in the production environment such as a data center, a cloud computing environment, a dedicated hosting environment, or one or more other computing environments in which one or more assets used by the application in the production environment are implemented; one or more computing systems or computing entities used to implement at least part of a system in the production environment; one or more virtual assets used to implement at least part of a system in the production environment; one or more supervisory or control systems, such as hypervisors, or other monitoring and management systems used to monitor and control assets or components of the production environment; one or more communications channels for sending and receiving data used to implement at least part of a system in the production environment; one or more access control systems for limiting access to various components of the production environment, such as firewalls and gateways; one or more traffic or routing systems used to direct, control, or buffer data traffic to components of the production environment, such as routers and switches; one or more communications endpoint proxy systems used to buffer, process, or direct data traffic, such as load balancers or buffers; one or more secure communication protocols or endpoints used to encrypt/decrypt data, such as Secure Sockets Layer (SSL) protocols, used to implement at least part of a system in the production environment; one or more databases used to store data in the production environment; one or more internal or external services used to implement at least part of a system in the production environment; one or more backend systems, such as backend servers or other hardware used to process data and implement at least part of a system in the production environment; one or more modules/functions used to implement at least part of a system in the production environment; or any other assets/components making up an actual production environment in which at least part of a system is deployed, implemented, accessed, and run, e.g., operated, as discussed herein, or as known in the art at the time of filing, or as developed after the time of filing.

As used herein, the term "computing environment" includes, but is not limited to, a logical or physical grouping of connected or networked computing systems or virtual assets using the same infrastructure and systems such as, but not limited to, hardware systems, systems, and networking/communications systems. Typically, computing environments are either known, "trusted" environments or unknown, "untrusted" environments. Typically, trusted computing environments are those where the assets, infrastructure, communication and networking systems, and security systems associated with the computing systems or virtual assets making up the trusted computing environment, are either under the control of, or known to, a party.

In various embodiments, each computing environment includes allocated assets and virtual assets associated with, and controlled or used to create, deploy, or operate at least part of the system.

In various embodiments, one or more cloud computing environments are used to create, deploy, or operate at least part of the system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, as known in the art at the time of filing, or as developed after the time of filing.

In many cases, a given system or service may utilize, and interface with, multiple cloud computing environments, such as multiple VPCs, in the course of being created, deployed, or operated.

As used herein, the term "virtual asset" includes any virtualized entity or resource, or virtualized part of an actual, or "bare metal" entity. In various embodiments, the virtual assets can be, but are not limited to, the following: virtual machines, virtual servers, and instances implemented in a cloud computing environment; databases associated with a cloud computing environment, or implemented in a cloud computing environment; services associated with, or delivered through, a cloud computing environment; communications systems used with, part of, or provided through a cloud computing environment; or any other virtualized assets or sub-systems of "bare metal" physical devices such as mobile devices, remote sensors, laptops, desktops, point-of-sale devices, etc., located within a data center, within a cloud computing environment, or any other physical or logical location, as discussed herein, or as known/available in the art at the time of filing, or as developed/made available after the time of filing.

In various embodiments, any, or all, of the assets making up a given production environment discussed herein, or as known in the art at the time of filing, or as developed after the time of filing can be implemented as one or more virtual assets within one or more cloud or traditional computing environments.

In one embodiment, two or more assets, such as computing systems or virtual assets, or two or more computing environments are connected by one or more communications channels including but not limited to, Secure Sockets Layer (SSL) communications channels and various other secure communications channels, or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, or virtual assets, as discussed herein, or available or known at the time of filing, or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, or computing systems, whether available or known at the time of filing or as later developed.

As used herein, the term "user experience display" includes not only data entry and question submission user interfaces, but also other user experience features and elements provided or displayed to the user such as, but not limited to, the following: data entry fields, question quality indicators, images, backgrounds, avatars, highlighting mechanisms, icons, buttons, controls, menus and any other features that individually, or in combination, create a user experience, as discussed herein, or as known in the art at the time of filing, or as developed after the time of filing.

As used herein, the terms "user experience page" and "user experience screen" are interchangeable in meaning and represent a changeable rendering or view of content that is provided to a user in the user experience display, according to one embodiment.

As used herein, the term "user experience" includes, but is not limited to, one or more of a search query creation process, an incremental search results receipt process, a user session, interview process, interview process questioning, or interview process questioning sequence, or other user experience features provided or displayed to the user such as, but not limited to, interfaces, images, assistance resources, backgrounds, avatars, highlighting mechanisms, icons, and any other features that individually, or in combination, create a user experience, as discussed herein, or as known in the art at the time of filing, or as developed after the time of filing.

Herein, the term "party," "user," "user consumer," and "customer" are used interchangeably to denote any party or entity that interfaces with, or to whom information is provided by, the disclosed methods and systems described herein, or a legal guardian of person or entity that interfaces with, or to whom information is provided by, the disclosed methods and systems described herein, or an authorized agent of any party or person or entity that interfaces with, or to whom information is provided by, the disclosed methods and systems described herein. For instance, in various embodiments, a user can be, but is not limited to, a person, a commercial entity, an application, a service, or a computing system.

As used herein, the term "analytics model" denotes one or more individual or combined algorithms or sets of ordered relationships that describe, determine, or predict characteristics of or the performance of a datum, a data set, multiple data sets, a computing system, or multiple computing systems. Analytics models or analytical models represent collections of measured or calculated behaviors of attributes, elements, or characteristics of data or computing systems. Analytics models include probabilistic topic models and predictive models (e.g., query classifiers), which identify the likelihood of one attribute or characteristics based on one or more other attributes or characteristics.

As used herein, the terms "interview" and "interview process" include, but are not limited to, an electronic, software-based, or automated delivery of multiple questions to a user and an electronic, software-based, or automated receipt of responses from the user to the questions, to progress a user through one or more groups or topics of questions, according to various embodiments.

As used herein the term "self-help system" is interchangeable with "self-service system" and "self-support system". A self-help system (e.g., a customer self-help system) is a system that enables customers and other users to help themselves find answers to questions, find specific content within a financial management system, navigate within the financial management system, or perform one or more actions (e.g., adjust the user tax data within a particular form), according to one embodiment. In contrast, the term "live customer support" denotes an interaction between a user of a financial management system and a customer support representative who uses a telephone call, instant messaging, a video conference, text messaging, or other mode of telecommunications to resolve questions or concerns of a user of the financial management system.

As used herein, the term "incremental search results" includes search results that are generated for search query terms based on the various information a financial management system has for a user, as a user enters the search query terms (e.g., in real-time) as part of a search query to a customer self-help system, according to one embodiment. Incremental search results include progressively searched for and filtered through text. As the user types, one or more possible matches for the text are found and immediately presented to the user, according to one embodiment. The incremental search results are specific to the domain of a financial management system and may include automated suggestions for additional search query terms that are specific to searching the financial management system, according to one embodiment. Because the incremental search results are specific to the domain of the financial management system, as used herein, "incremental search results" is used interchangeably with "domain-specific incremental search results". The incremental search results are search results for a partial or complete search query that is based on the received search query terms and based on user tax data (e.g., user profile data), according to one embodiment. The incremental search results are search results for one or more potential search queries that a user could formulate from search query terms that have been received by the customer self-help system, according to one embodiment.

As used herein the term "recency boost" denotes increasing or decreasing a priority, ranking, or otherwise metricized relevance of customer support content that is managed or hosted by a customer self-help system, according to one embodiment. Recency boosting denotes the use of information other than a user's search criteria or user's information to prioritize, rank, or otherwise metricize the relevance of customer support content, according to one embodiment. Recency boosting increases, decreases, or maintains a priority, ranking, or otherwise metricized relevance of customer support content based on sources of content relevance data such as one or more of: media outlets, taxation agencies, a financial management system, a financial management system service provider, a customer self-help system, and a customer self-help system service provider, according to one embodiment.

Architecture

FIG. 1 is an example block diagram of a production environment 100 for improving search results by recency boosting customer support content for a customer self-help system associated with one or more financial management systems, according to one embodiment. The production environment 100 includes a customer self-help system 110 that recency boosts customer support content based on content relevance data 130 that is received from one or more of a variety of sources of content relevance data (discussed below), according to one embodiment. The customer self-help system 110 applies one or more recency boosting techniques to customer support content that is managed by the customer self-help system 110, to improve the likelihood that a user will receive relevant customer support content in response to submitting a search query to the customer self-help system 110, according to one embodiment. The customer self-help system 110 retrieves the content relevance data 130 from one or more of a variety of sources, in order to determine and apply relevance weighting to customer support content that is managed by the customer self-help system 110, according to one embodiment. By applying relevance weighting to the customer support content, the customer self-help system 110 increases the likelihood that the search results that are provided in response to a received search query, take into account news or information updates related to the search query.

The customer self-help system 110 is communicatively coupled to receive the content relevance data 130 through a network 101, according to one embodiment. The network 101 represents the Internet, according to one embodiment. The customer self-help system 110 is communicatively coupled to one or more of a variety of sources of the content relevance data 130 through one or more of communications channels 102, 103, 104, and 105, according to one embodiment.

The content relevance data 130 is provided by one or more of a variety of sources, according to one embodiment. The sources of the content relevance data 130 include one or more of a financial management system 132, a taxation agency 134, and media outlets 136, according to one embodiment. The financial management system 132 includes one or more of a tax return preparation system, a business financial management system, and a personal financial management system (not shown), according to one embodiment. The financial management system 132 includes, but is not limited to, one or more of: TurboTax® available from Intuit, Inc. of Mountain View, Calif.; TurboTax® Online™ available from Intuit, Inc. of Mountain View, Calif.; QuickBooks®, available from Intuit, Inc. of Mountain View, Calif.; QuickBooks® Online™, available from Intuit, Inc. of Mountain View, Calif.; Mint®, available from Intuit, Inc. of Mountain View, Calif.; Mint® Online, available from Intuit, Inc. of Mountain View, Calif.; or various other systems discussed herein, or known to those of skill in the art at the time of filing, or as developed after the time of filing, according to various embodiments.

The financial management system 132 provides different types of content relevance data 130, from which the customer self-help system 110 determines content relevance weights that are used to recency boost customer support content, according to one embodiment. The financial management system 132 provides product news data 138 and self-help search trends data 140, according to one embodiment. The product news data 138 includes announcements from the service provider for the financial management system 132, according to one embodiment. The announcements from the service provider of the financial management system 132 include, but are not limited to, news or updates about product errors that have been recently detected, news or updates about product errors that have recently been fixed, news or updates about product features that are planned for future releases of the financial management system 132, news or updates about product features that have been released, and news or updates about product features that have been retired or otherwise removed from the financial management system 132, according to one embodiment.

The self-help search trends data 140 includes various trends in search queries that are submitted to the financial management system 132 or to the customer self-help system 110, according to one embodiment. The trends in search queries include prevalent search queries, dominant search queries, or trending search queries that are submitted to the financial management system 132 or to the customer self-help system 110, according to one embodiment. The self-help search trends data 140 represents search queries that are trending within one or more windows of time (e.g., within tax season, within a fourth quarter of the fiscal year, within the last week, etc.), according to one embodiment. The self-help search trends data 140 represents search queries that are trending based on a comparison to all search queries received by the financial management system 132 or by the customer self-help system 110, according to one embodiment. Self-help search trends data 140 that represent trends that are based on a comparison are determined based on a percentage or quantity of search queries that are above an average or that deviate from a typical or expected trend in search query submissions, according to one embodiment.

The financial management system 132 or the service provider for the financial management system 132 provides the product news data 138 in one or more electronic media formats such as, but not limited to, Rich Site Summary ("RSS") feeds, email updates, website updates, and electronic notification updates, according to one embodiment.

The financial management system 132 or the customer self-help system 110 determines, maintains, and provides the self-help search trends data 140, based on search queries submitted to the financial management system 132 and to the customer self-help system 110, according to one embodiment.

The taxation agency 134 is another source of the content relevance data 130, according to one embodiment. Examples of the taxation agency 134 include, but are not limited to, one or more of the Internal Revenue Service, state taxation agencies (e.g., the California Tax Service Center, the New York State Department of Taxation and Finance, etc.), and other federal or state government or private taxation agencies or services, according to various embodiments. The taxation agency 134 provides tax law updates data 142 that represent updates to federal tax law, updates to state tax law, or a combination of updates to federal tax law and state tax law, according to one embodiment. Similar to the product news data 138, the taxation agency 134 makes the tax law updates data 142 available in one or more electronic media formats such as, but not limited to, RSS feeds, email updates, website updates, and electronic notification updates, according to one embodiment. The tax law updates data 142 may include content that will stay current for a long time (e.g., tax law) as well as content that can quickly become outdated (e.g., tax filing season updates), according to one embodiment. A specific illustrative example of an e-news subscription that is available for acquiring tax law updates from the Internal Revenue Service is IRS Newswire, which can include two to three news releases on a weekly basis about topics such as tax administration, tax law changes, and tax filing season updates.

Media outlets 136 are another source of the content relevance data 130, according to one embodiment. Examples of media outlets 136 include, but are not limited to, one or more of electronic magazines, electronic newspapers, and websites, according to one embodiment. The media outlets 136 are financial information media outlets (e.g., the financial Times, CNN money, etc.), according to one embodiment. A specific illustrative example of financial news data 144 is an electronically-available article that discusses tips on reducing a federal tax liability by taking advantage of energy tax credits made available by the federal government for one or more predetermined periods of time.

The customer self-help system 110 receives or acquires the content relevance data 130 and uses the content relevance data 130 to adjust (i.e., recency boost) the relevance of customer support content based on recent news, changes in laws, and product announcements, according to one embodiment. By using the content relevance data 130 to adjust the relevance of customer support content, the customer self-help system 110 provides customer support content that is prioritized or relevance-weighted at least partially based on the product news data 138, the self-help search trends data 140, the tax law updates data 142, and the financial news data 144, according to one embodiment.

The customer self-help system 110 uses a content relevance engine 112 to acquire the content relevance data 130, according to one embodiment. The content relevance engine 112 acquires the content relevance data 130 using one or more of a variety of Internet information acquisition techniques, according to one embodiment. The content relevance engine 112 uses a RSS feed reading scripts, libraries, or tools that are available in or developable with Python, Perl, PHP, JavaScript, or one or more other programming languages that can be used to interface with sources of the content relevance data 130 over the network 101, according to one embodiment. The content relevance engine 112 subscribes to one or more email or electronic delivery alert systems and uses one or more scripts, libraries, or tools in Python, Perl, PHP, JavaScript, or one or more other programming languages to parse the email or electronic delivery alerts from the sources of the content relevance data 130, according to one embodiment.

The customer self-help system 110 uses the content relevance engine 112 to determine content relevance topics 114 and content relevance weights 116, which are used to recency boost the customer support content that is provided to users in response to search query submissions, according to one embodiment. The content relevance engine 112 generates the content relevance topics 114 by applying the content relevance data 130 to a content relevance analytics model 113, according to one embodiment. The content relevance analytics model 113 includes, but is not limited to, one or more of a probabilistic topic model and a predictive model, according to one embodiment. A probabilistic topic model receives text and identifies one or more topics that are prevalent throughout the received text, according to one embodiment. The probabilistic topic model is implemented using one or more of a Latent Dirichlet Allocation ("LDA") algorithm, Latent Semantic Indexing ("LSI"), query clustering, query de-duplication, and one or more other techniques currently known or later developed for generating probabilistic topic models, according to various embodiments. A predictive model identifies the likelihood that one or more of the content relevance topics 114 are relevant to the content relevance data 130 by training the predictive model on historical content relevance data from which the content relevance topics 114 have already been identified using other techniques, according to one embodiment. The predictive model used by the content relevance engine 112 is trained using predictive model training operations that include, but are not limited to, one or more of regression, logistic regression, decision trees, artificial neural networks, support vector machines, linear regression, nearest neighbor methods, distance based methods, naive Bayes, linear discriminant analysis, k-nearest neighbor algorithm, another query classifier, and any other presently known or later developed predictive model training operations, according to one embodiment.

The content relevance topics 114 represent one or more topics that are extracted by the content relevance engine 112 from the content relevance data 130, according to one embodiment. The content relevance topics 114 include information or subject matter that is relevant to someone using the financial management system 132, according to one embodiment. Specific illustrative examples of the content relevance topics 114 include invoicing, tracking expenses, receipts, accounts payable, accounts receivable, expense tracking, product care, taxes, income, deductions, retirement accounts, budgets, personal spending, account management, user authentication, scams, and security threats, according to various embodiments.

The content relevance engine 112 determines the content relevance weights 116, according to one embodiment. The content relevance engine 112 determines the content relevance weights 116 at least partially based on the content relevance topics 114 that are extracted or derived from the content relevance data 130, according to one embodiment. The content relevance weights 116 are proportional to the quantities of content relevance topics 114 that are derived from the content relevance data 130, according to one embodiment. The content relevance weights 116 are determined based on the prevalence of the content relevance topics 114 in the content relevance data 130, according to one embodiment. As an example, if one of the content relevance topics 114 (e.g. cyber security) appeared 100 times in the content relevance data 130 for a particular period of time, then the content relevance weights 116 for the one of the content relevance topics 114 will be relatively high. As another example, if one of the content relevance topics 114 (e.g. energy credits) appears only once in the content relevance data 130 for a particular period of time, then the content relevance engine 112 weights that one of the content relevance topics 114 relatively low, according to one embodiment.

The content relevance weights 116 can span one of a number of different ranges of values. In one embodiment, the range of values for the content relevance weights 116 is 0-1, with values that are closer to 1 being highly relevant and values being closer to 0 being less relevant, according to one embodiment. In one embodiment, the content relevance weights 116 span from 0-2, and a topic or customer support content receives a weight of less than 1 to decrease its relevance, a weight of greater than 1 to increase its relevance, and a value of 1 to maintain its relevance, according to one embodiment. While specific illustrative examples of ranges include 0-1 and 0-2, any range of numbers are possible for use in weighting the relevance of customer support content based on content relevance data 130, according to one embodiment.

The customer self-help system 110 uses the content relevance weights 116 to update and maintain a content relevance table 118, according to one embodiment. The content relevance table 118 and content relevance weights 116 are used to boost or buck (i.e., increase or decrease) the relevance of the customer support content that is managed by the customer self-help system 110, according to one embodiment. The content relevance table 118 includes a topic column 120, a content identifier column 122, and a content relevance weights column 124, as example columns of the content relevance table 118, according to one embodiment. The content relevance table 118 can include more columns than illustrated, or fewer columns than illustrated, according to various embodiments. The topic column 120 represents a topical categorization of the customer support content that is available to provide to a user in response to a search query, according to one embodiment. The content identifier column 122 represents identification (e.g., numerical or descriptive) of various types of customer support content that can be provided to the user in response to receiving a search query from the user, according to one embodiment. Illustrative examples of content include, but are not limited to, a 401(k) calculator, an energy credits tutorial, a tax error announcement, browser settings instructions, a potential search query "how to create an invoice", and a potential search query "how to estimate quarterly taxes", according to one embodiment. The content relevance weights column 124 is populated with the content relevance weights 116 that are determined by the content relevance engine 112, according to one embodiment. In the illustrated example of the content relevance table 118, the values of the content relevance weights 116 that are included in the content relevance weights column 124 span the value of 0-2, with values closer to 0 having a lower relevance to users and with values closer to 2 having a higher relevance to users, according to one embodiment.

Row 126 of the content relevance table 118 represents one specific illustrative example of a topic, content identifier, and content relevance weight that can be included in the content relevance table 118, based on the content relevance data 130, according to one embodiment. If, for example, the product news data 138 includes a taxpayer announcement that the financial management system 132 erroneously calculated state tax liabilities and state tax refunds for a particular state, the content relevance engine 112 may assign a value of 1.2 to the content relevance weights 116 for the topic of product errors, and more specifically for content related to a taxpayer announcement, according to one embodiment. By assigning a value of 1.2 to the content relevance weights 116 that are associated with the taxpayer announcement, the customer self-help system 110 uses the content relevance table 118 to increase or recency boost the taxpayer announcement, so that the search engine used by the customer self-help system 110 is more likely to provide the taxpayer announcement to the user, in response to receiving a search query, according to one embodiment.

Row 127 of the content relevance table 118 represents one specific illustrative example of a topic, content identifier, and content relevance weight that can be included in the content relevance table 118, based on the content relevance data 130, according to one embodiment. If, for example, the financial management system 132 previously included a product error that was associated with needing to adjust web browser settings to properly view content for the financial management system 132, and the error no longer exists because it has been resolved, then the content of browser settings instructions represents a potential search result that will annoy or confuse users because it provides instructions to adjust browser settings that no longer need to be adjusted, according to one embodiment. As a result, the customer self-help system 110 assigned the value of 0.2 as the content relevance weights 116 for the topic of product error that is associated with the content identifier for browser settings instructions, to decrease the likelihood of the user receiving the browser settings instructions, and needlessly adjusting their web browser settings, according to one embodiment.

The customer self-help system 110 provides recency boosted customer support content 128 in response to receiving a search query 129 from the user, according to one embodiment. The customer self-help system 110 uses the search query 129 to identify relevant portions of customer support content, and the customer self-help system 110 uses the content relevance table 118 to further distinguish relevant customer support content from less relevant customer support content, according to one embodiment. The customer self-help system 110 then provides the recency boosted or distinguished customer support content 128 to a user of the customer self-help system 110, according to one embodiment.

Figure 2A:
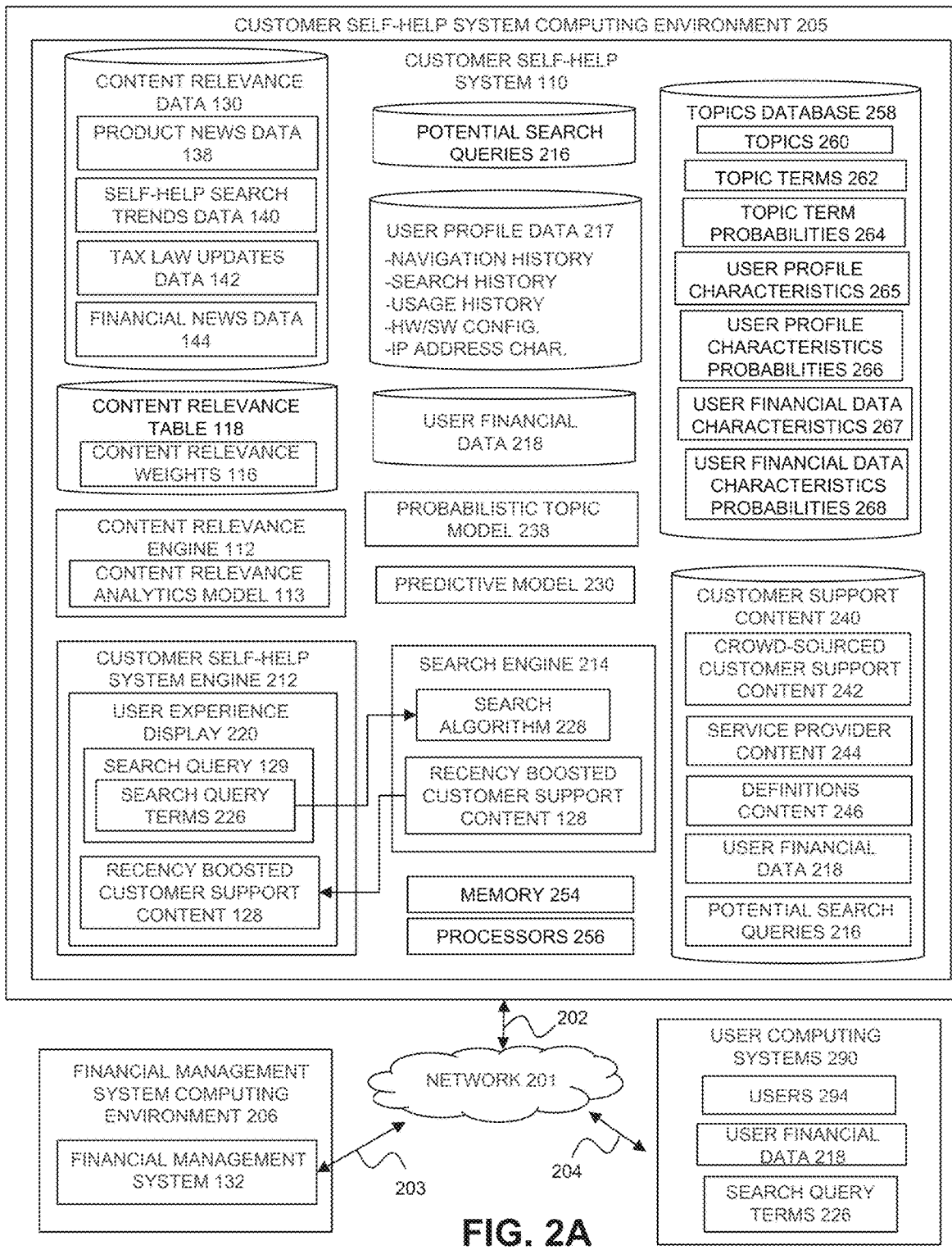
FIGS. 2A and 2B are block diagrams of an architecture for improving search results by recency boosting customer support content for a customer self-help system associated with one or more financial management systems, in accordance with one embodiment.
Figure 2B:
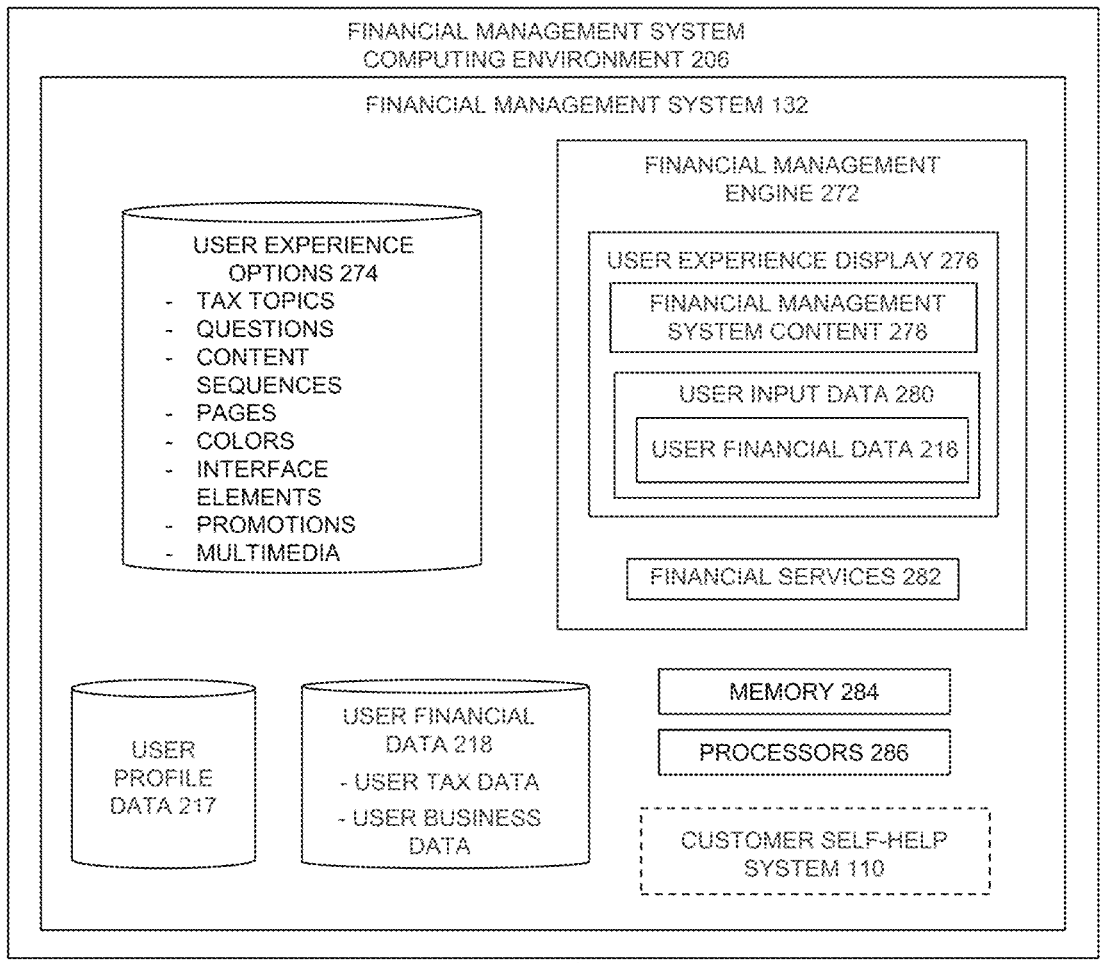
Figure 2B:
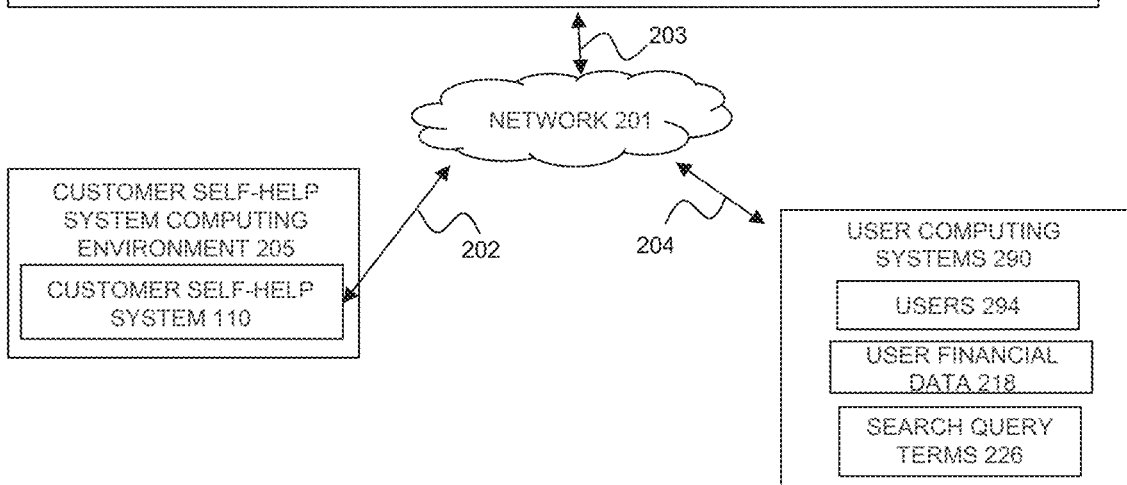

FIGS. 2A and 2B are an example block diagram of a production environment 200 for improving search results by recency boosting customer support content for a customer self-help system associated with one or more financial management systems, according to one embodiment. The production environment 200 includes a number of components in common with the production environment 100 (shown in FIG. 1), and the common components are identified using the same reference number in both production environments 100 and 200. The production environment 200 illustrates techniques for identifying customer support content that is relevant to a search query, and is used to describe the use of content relevance weights in prioritizing customer support content, according to one embodiment. The production environment 200 includes the customer self-help system 110, the financial management system 132, and user computing systems 290 that are communicatively coupled through a network 201, according to one embodiment. All or part of the modules, functionality, or components of the customer self-help system 110 are hosted in a customer self-help system computing environment 205, according to one embodiment. All or part of the modules, functionality, or components of the financial management system 132 are hosted in a financial management system computing environment 206, according to one embodiment. All or part of the modules, functionality, or components of the customer self-help system 110 and the financial management system 132 are hosted in the customer self-help system computing environment 205 or in the financial management system computing environment 206, according to one embodiment. All or part of the modules, functionality, or components of the customer self-help system 110 and the financial management system 132 are hosted in one or more of the customer self-help system computing environment 205, the financial management system computing environment 206, and one or more additional computing environments (not shown), according to one embodiment. The customer self-help system 110, the financial management system 132, and the user computing systems 290 are communicatively coupled to one another through the network 201 through one or more communications channels 202, 203, and 204, according to one embodiment. The network 201 is the Internet, according to one embodiment.

The customer self-help system 110 includes a customer self-help system engine 212, a search engine 214, potential search queries 216, user profile data 217, and user financial data 218 to identify and deliver customer support content that is relevant to a search query received from a user, according to one embodiment. The customer self-help system 110 also includes the content relevance engine 112, the content relevance table 118, and the content relevance data 130 that are used by the customer self-help system 110 to improve search results by recency boosting customer support content based on the content relevance data 130, according to one embodiment. The customer self-help system engine 212 receives one or more complete or partial search query terms from users of the customer self-help system 110, and provides recency boosted customer support content to the users in response to receipt of the search query terms, according to one embodiment. The customer self-help system 110 uses the search engine 214 to search for customer support content that is relevant to the search query terms, at least partially based on the search query terms, the user profile data 217, and the user financial data 218, according to one embodiment. The search engine 214, the customer self-help system engine 212, or the customer self-help system 110 defines the recency boosted customer support content that is delivered to users in response to search query terms or search queries received from the users, according to one embodiment.

The customer self-help system engine 212 or the customer self-help system 110 provides a user experience display 220 to receive a search query 129 from a user and to provide recency boosted customer support content 128 to the user, according to one embodiment. The user experience display 220 includes, but is not limited to, one or more of text boxes, menus, buttons, avatars, audio/video content, and other user experience elements to receive the search query 129 and to provide the recency boosted customer support content 128, according to one embodiment. The user experience display 220 includes a search text box (not shown) that the user uses to enter the search query 129 with one or more search query terms 226, according to one embodiment. The user experience display 220 includes a results text box (not shown) that is visible to the user to allow the user to receive the recency boosted customer support content 128, according to one embodiment. The results text box is displayed adjacent to the search text box, according to one embodiment.

The customer self-help system 110 uses the search engine 214 to search the customer support content 240 for content to include in the recency boosted customer support content 128, based on one or more of the search query terms 226, the user financial data 218, and the user profile data 217, according to one embodiment.

In one embodiment, the customer self-help system 110 includes one or more potential search queries 216 within the recency boosted customer support content 128. The potential search queries 216 represent search queries that have been formulated or submitted to the customer self-help system 110 or to the financial management system 132 by a current user or by one or more prior users of the customer self-help system 110 or of the financial management system 132, according to one embodiment. The potential search queries 216 are stored in one or more tables, databases, or other data structures, that store records of previously received or defined search queries, according to one embodiment. In one embodiment, each of the potential search queries 216 is considered a topic, and each of the potential search queries 216 is associated with one or more topic terms, one or more topic term probabilities, user profile characteristics, and user financial data characteristics. The search engine 214 identifies potential search queries 216 that include the same topic or topics as one or more received search query terms 226, and provides (to the user) customer support content 240 that is responsive to the more relevant one of the potential search queries 216, as recency boosted customer support content 128, according to one embodiment.

The search engine 214 or the customer self-help system 110 uses the user financial data 218 to identify which portions of the customer support content 240 to include in the recency boosted customer support content 128, according to one embodiment. The user financial data 218 includes one or more of user tax data, user business data, and user personal financial data, according to one embodiment. As a specific illustrative example, the search engine 214 or the customer self-help system 110 provides a user's state tax refund amount (e.g., of $331.11) in an incremental search result that is included in the recency boosted customer support content 128, in response to receiving a search query 129 of "tax refund". The user financial data 218 is stored in one or more tables, databases, or other data structures, according to one embodiment. The user financial data 218 includes existing user financial data received in a current year or in prior years from a present user or from other users, according to one embodiment. The user financial data 218 includes new user financial data, which represents user financial data acquired from or about a present user (e.g., the submitter of the search query terms) during a current user session with the customer self-help system 110 or with the financial management system 132, according to one embodiment. The user financial data 218 includes any user information or tax information that has been used, that can be used, or that may be used at a future date to prepare a user's tax return, to manage a user's business, or to manage a user's personal finances, according to one embodiment. Examples of the user financial data 218 include, but are not limited to, one or more of a user's name, a date of birth, an address, a zip code, a home ownership status, a marital status, an annual income, a job title, an employer's address, spousal information, children's information, asset information, medical history, occupation, information regarding dependents, salary and wages, interest income, dividend income, business income, farm income, capital gain income, pension income, individual retirement account ("IRA") distributions, unemployment compensation, education expenses, health savings account deductions, moving expenses, IRA deductions, student loan interest deductions, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, business income, accounts receivable, accounts payable, invoice information, inventory quantities, inventory costs, operating expenses, business travel records, business travel expenses, customer contact information, credit card balances, quarterly tax estimations, spending category budgets, outstanding loan balances, personal spending trends, categories of business expenses, categories of personal expenses, employee information, employee expenses, insurance costs, and residential energy credits.

The customer self-help system 110 receives the user financial data 218 from the financial management system 132, according to one embodiment. The customer self-help system 110 is optionally integrated into the financial management system 132 and uses data retrieval commands or calls to retrieve at least part of the user financial data 218 for use in determining the recency boosted customer support content 128, according to one embodiment. The content of the user financial data 218 or the values of the user financial data 218 are user financial data characteristics, according to one embodiment.

The search engine 214 uses a search algorithm 228 that uses a combination of one or more the user profile data 217 and the user financial data 218, to provide context to the search query terms in order to select which portions of the customer support content 240 are relevant to the search query 129, according to one embodiment. The user profile data 217 includes records of actions (e.g., user experience pages visited) in both current and prior search sessions, which the customer self-help system 110 uses to identify topics or customer support content 240 that is relevant to the search query 129, according to one embodiment. The user profile data 217 includes, but is not limited to, the user's navigation or browsing history within the financial management system 132, the user's search history within the financial management system 132, the user's navigation (e.g., interview screen visitation history), browsing, or search history within the customer self-help system 110, clickstream data for the user, estimated education level of the user, user-experience with the financial management system 132 (e.g., a repeat versus first-time user), Internet Protocol ("IP") address characteristics (e.g., library, corporation, residential, foreign IP address, etc.), and hardware or software configurations of the user's computing device (e.g., Mac, PC, mobile device, operating system, etc.), according to various embodiments.

The search engine 214 or the customer self-help system 110 uses the search algorithm 228 to define the recency boosted customer support content 128, according to one embodiment. The search engine 214 receives the search query terms 226 from the customer self-help system engine 212 and applies the search query terms 226 to the search algorithm 228 to generate/define the recency boosted customer support content 128, according to one embodiment. The search engine 214 uses the search algorithm 228 to search the potential search queries 216 to determine which one of the potential search queries 216 is likely to be relevant to the user, in the context of the search query terms 226, the user financial data 218, and the user profile data 217, according to one embodiment. Relevant ones of the potential search queries 216 and answers to the relevant ones of the potential search queries are used to populate the recency boosted customer support content 128, according to one embodiment. In one embodiment, the search algorithm 228 employs one or more of a probabilistic topics model, query clustering, query de-duplication, Latent Dirichlet allocation algorithm, one or more other predictive models, and one or more other database or content searching algorithms for matching one or more of the search query terms 226, the user profile data 217, and the user financial data 218 to relevant ones of the potential search queries 216, according to one embodiment. The search engine 214 uses the search algorithm 228 to match one or more of the search query 129, with context from the user profile data 217 and the user financial data 218, to relevant portions of the customer support content 240, according to one embodiment.

The search algorithm 228 includes or uses a probabilistic topic model 238 to identify topics for the search query terms 226, for the search query 129, and for the potential search queries 216, according to one embodiment. The probabilistic topic model 238 receives the potential search queries 216 or the search query terms 226 and identifies the topics of the potential search queries 216 or the topics of the search query terms 226, according to one embodiment. The probabilistic topic model 238 utilizes one or more of the Latent Dirichlet allocation algorithm, Latent Semantic Indexing ("LSI"), query clustering, query de-duplication, and one or more other techniques currently known or later developed for generating probabilistic topic models, to identify the topics of the potential search queries 216 or the topics of the search query terms 226, according to one embodiment. The search engine 214 uses the topics of the potential search queries 216 or the topics of the search query terms 226 to match relevant ones of the potential search queries 216 with the search query terms 226, according to one embodiment. The search engine 214 selects one or more relevant ones of the potential search queries 216 and answers to the relevant ones of the potential search queries as potential content for the recency boosted customer support content 128, according to one embodiment.

The customer self-help system 110 uses the probabilistic topic model 238 (e.g., utilizing the Latent Dirichlet allocation algorithm) to populate the topics database 258 to determine the relevance between the search query terms 226 and the customer support content 240, according to one embodiment. The customer self-help system 110 maintains a topical correlation or mapping between the customer support content 240 and particular topics 260, which enables topical search and identification of user experience pages and other content within the customer support content 240, according to one embodiment. The topics database 258 includes topics 260, topic terms 262, the topic term probabilities 264, user profile characteristics 265, user profile characteristics probabilities 266, user financial data characteristics 267, and user financial data characteristics probabilities 268, according to one embodiment.

The topics 260 represent themes, subjects, or categories of information that are included in one or more of the potential search queries 216, the user financial data 218, the user profile data 217, and the customer support content 240, according to one embodiment. The topics 260 are identified by applying one or more of the potential search queries 216, the user financial data 218, the user profile data 217, and the customer support content 240 to the probabilistic topic model 238, according to one embodiment. As a result, the topics 260 represent themes, subjects, or categories of information stored in: the potential search queries 216, the user financial data 218, the user profile data 217, and the customer support content 240, according to one embodiment.

Specific illustrative examples of the topics 260 include, but are not limited to, one or more of product errors, security threats, scams, budgeting, receipts, invoices, tax estimates, authentication, account management, W-2, 1099, dividends, interest from loans, taxes exempt dividends, stocks, mutual funds, bonds, capital loss, capital gains, retirement plans, security, rentals, state and local tax refunds, business income, schedule K-1, farm income, business taxes, business expenses and credit, sale of business property, gambling winnings, alimony received, jury duty, child's income, sale of home, property taxes, mortgage insurance, home energy credits, mortgage interest credit, home buyer credit, earned income credit, child and dependent care, adoption credit, child tax credit, donations to charity, car registration fees, personal property taxes, education expenses, student loan interest, medical expenses, income taxes, sales tax, foreign taxes, individual retirement account contributions, and job-related expenses, according to one embodiment.

In one embodiment, the topics 260 include the potential search queries 216 and include multiple terms. In one embodiment, the topics 260 include a single term. In one embodiment, the topics 260 include one or two terms but are shorter than a full search query.

Figure 3:
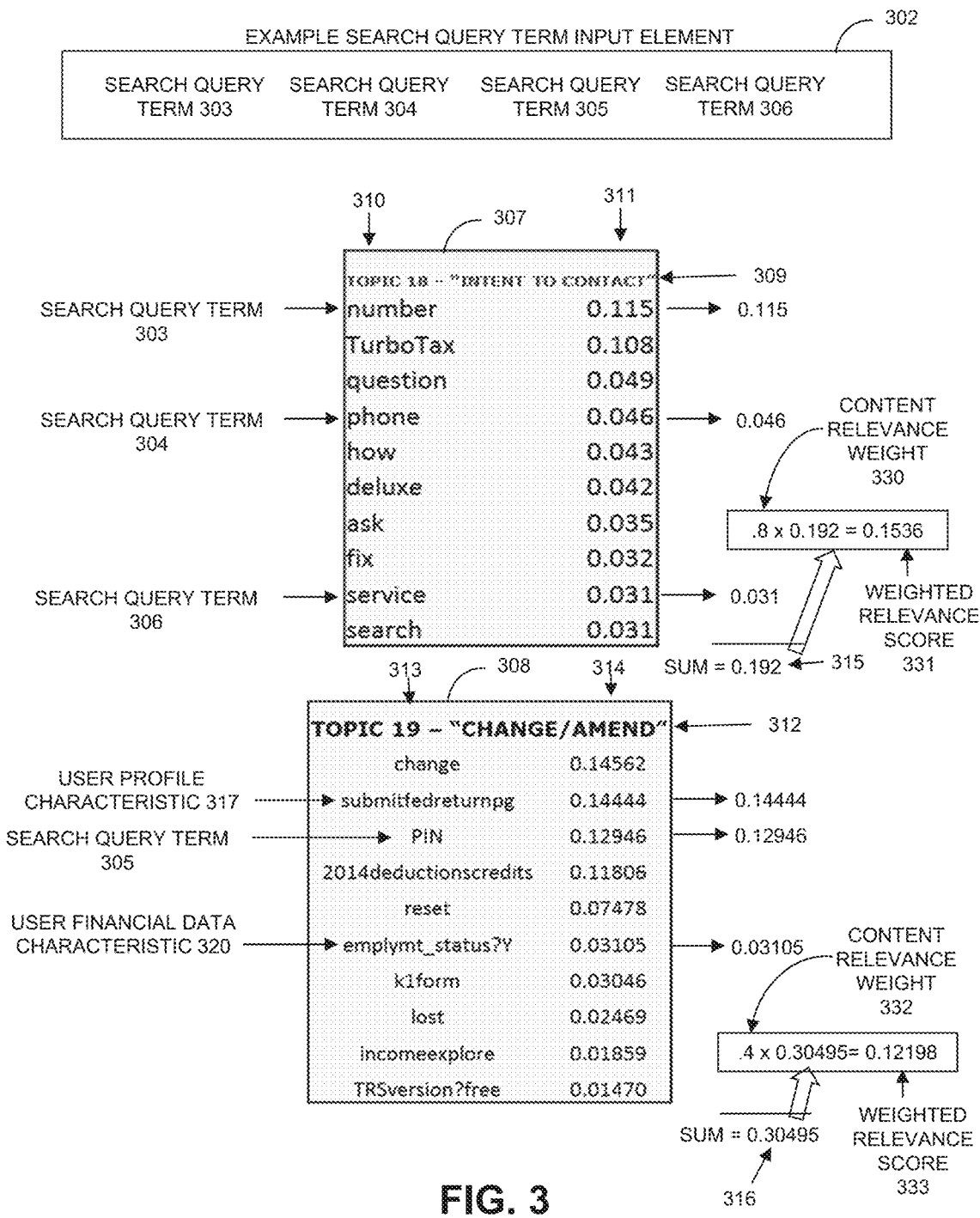
FIG. 3 is a diagram that illustrates one example of a technique for determining a relevant topic for one or more search query terms received from a user, in accordance with one embodiment.

The topic terms 262 represent words that are likely to appear in the topics 260, according to one embodiment. The topic terms 262 have topic term probabilities 264 of occurring in the topics 260, according one embodiment. In other words, each of the topic terms 262 has a topic term probability 264 that defines the probability of a topic term occurring in a topic, according one embodiment. Although each of the topic terms 262 may probabilistically occur in more than one of the topics 260, the topic term probabilities 264 for reoccurring topic terms 262 will likely be different for different topics 260, according to one embodiment. A specific illustrative example of topics 260, topic terms 262, and topic term probabilities 264 is illustrated in FIG. 3 and is discussed below in connection with diagram 300, according to one embodiment.

The user profile characteristics probabilities 266 or the user financial data characteristics probabilities 268 quantify the likelihood that a user will have a question about a topic when one or more of the user profile characteristics 265 or the user financial data characteristics 267 exist, according to one embodiment. The user profile characteristics 265 (e.g., whether the user has performed a particular action) are associated with the user profile characteristics probabilities 266, and the user financial data characteristics 267 (e.g., whether the user qualifies for or has entered a particular tax-related parameter) are associated with the user financial data characteristics probabilities 268, according to one embodiment. An example of the user profile characteristics 265 is a location of a user (e.g., identification of a user experience page that the user is viewing) within a tax return preparation interview, according to one embodiment. The user profile characteristics probabilities 266 represent a likelihood or a probabilistic relationship between the topics 260 and the user profile characteristics 265, and can be used by the probabilistic topic model 238 to add context and certainty to the identification of a particular topic (e.g., a potential search query) as being relevant to the search query terms 226 or to the user, according to one embodiment. The user financial data characteristics probabilities 268 represent a likelihood or a probabilistic relationship between the topics 260 and the user financial data characteristics 267, and can be used by the probabilistic topic model 238 to add context and certainty to the identification of a particular topic as being relevant to the search query terms 226 or to the user, according to one embodiment. In one embodiment, the predictive model 230 or the probabilistic topic model 238 generate the user profile characteristics probabilities 266 or the user financial data characteristics probabilities 268 by applying one or more predictive algorithms (e.g., regression, neural networks, Latent Dirichlet allocation, or any other presently known or later developed algorithms) to the user financial data 218 and to the user profile data 217.

The search algorithm 228 includes or uses a predictive model 230 for determining a likelihood of potential search queries 216, user financial data 218, or customer self-help content being relevant to the received search query terms 226 within the context of a particular set of the user financial data 218 and within the context of particular set of user profile data 217, according to one embodiment.

The predictive model 230 is trained using one or more prior searches performed with the search engine 214, prior search queries submitted by users to the customer self-help system 110, the user financial data 218, the user profile data 217, and the customer support content 240, according to one embodiment. The predictive model 230 is trained using predictive model training operations including, but not limited to, one or more of regression, logistic regression, decision trees, artificial neural networks, support vector machines, linear regression, nearest neighbor methods, distance based methods, naive Bayes, linear discriminant analysis, k-nearest neighbor algorithm, another query classifier, and any other presently known or later developed predictive model training operations, according to one embodiment.

The customer support content 240 includes a variety of data representing content that can be provided in response to a user's search query 129, according to one embodiment. The customer support content 240 includes one or more of crowd-sourced customer support content 242, service provider content 244, definitions content 246, the user financial data 218, and the potential search queries 216, according to one embodiment. The crowd-sourced customer support content 242 includes questions and responses that are submitted by a community of question askers and response providers that use the customer self-help system 110 or another question and answer customer support system that is associated with the financial management system 132, according to one embodiment. The crowd-sourced customer support content 242 can also be referred to as user generated content ("UGC") to distinguish the crowd-sourced customer support content 242 from the service provider content 244, according to one embodiment. The service provider content 244 includes white papers, questions, answers, frequently asked questions, answers to frequently asked questions, tutorials, audio/video content, interactive content, or other content that can be used to assist users in learning about taxes, tax preparation, financial business management, personal financial management, the financial management system 132, or other relevant subject matter, according to one embodiment. The definitions content 246 include acronym definitions, definitions of tax-specific terms (e.g., tax jargon), definitions of terms that are related to tax law, preparing tax returns, business-specific terms, definitions of terms that are related to financial business management, and the financial management system 132, according to one embodiment.

The customer self-help system 110 increases or decreases a priority, rank, or other metricized relevance of the customer support content 240 at least partially based on the content relevance data 130, according to one embodiment. In other words, the customer self-help system 110 applies recency boosting to the customer support content 240 at least partially based on the content relevance data 130, according to one embodiment. In particular, the customer self-help system 110 increases or decreases a priority, rank, or other metricized relevance of the customer support content 240 at least partially based on one or more of the product news data 138, the self-help search trends data 140, the tax law updates data 142, and the financial news data 144, according to one embodiment.

The customer self-help system 110 increases or decreases a priority, rank, or other metricized relevance of the customer support content 240 with the content relevance table 118, according to one embodiment. The content relevance table 118 includes content relevance weights 116, which are at least partially based on the content relevance data 130, according to one embodiment. The content relevance weights 116 are a metricized representation of relevance of the topics 260 and of the customer support content 240, according to one embodiment. The content relevance weights 116 represent whether a group of the topics 260 should have an increased or decreased likelihood of delivery to a user, in response to the search query 129, according to one embodiment. Consequently, the content relevance weights 116 represent whether one or more entries (e.g., user experience pages) in the customer support content 240 should have an increased or decreased likelihood of delivery to a user, in response to the search query 129, according to one embodiment.

In one embodiment, all or part of the content relevance table 118 is integrated into the topics database 258. In one embodiment, the content relevance weights 116 are inserted into the topics database 258 as a column, to associate the content relevance weights 116 with the topics 260.

In one embodiment, all or part of the content relevance table 118 is integrated into the customer support content 240. In one embodiment, the content relevance weights 116 are inserted into the customer support content 240 as a column, to associate the content relevance weights 116 with the entries (e.g., user experience pages, potential search queries, service provider content, etc.) in the customer support content 240. In one embodiment, the customer support content 240 includes content identifiers such as identification numbers, content descriptions, and reference numbers that are used to reference user experience pages, documents, questions, answers, definitions, user financial data, potential search queries, and other content for the customer support content 240.

In one embodiment, the content of the topics database 258 and the content of the customer support content 240 is maintained in tables, columns, rows, or other entries in a single database (not shown). In one embodiment, the content relevance weights are included in the single database shared by the content of the topics database 258 and the content of the customer support content 240.

In one embodiment, the topics 260 are recency boosted with the content relevance weights 116. The content relevance weights 116 are associated with the topics 260 to increase or decrease the relevance of each one of the topics 260. A specific illustrative example of recency boosting the topics 260 by applying one or more of the content relevance weights to one or more of the topics 260 is provided in the disclosure of the diagram 300 (shown in FIG. 3).

The customer self-help system 110 uses the content relevance engine 112 and the content relevance analytics model 113 to determine or define the content relevance weights 116, according to one embodiment. The content relevance analytics model 113 includes or uses the probabilistic topic model 238, according to one embodiment. The content relevance analytics model 113 updates the content relevance weights 116 dynamically, as the customer self-help system 110 acquires or receives the content relevance data 130, according to one embodiment.

The customer self-help system 110 is wholly or partially stored in memory 254 (inclusive of non-volatile memory and volatile memory) and is wholly or partially executed by processors 256, according to one embodiment.

The user computing systems 290 are representative of one or more user computing systems that are used by one or more users 294 to provide the user financial data 218 to the financial management system 132, according to one embodiment. The user computing systems 290 are used to provide search query terms 226 to the customer self-help system 110 (directly or indirectly through the financial management system 132), and are used to receive the recency boosted customer support content 128 from the customer self-help system 110 (directly or indirectly through the financial management system 132), according to one embodiment.

FIG. 2B illustrates additional features of the financial management system 132 within the production environment 200, according to one embodiment. The financial management system 132 includes a financial management system engine 272, user experience options 274, and the user financial data 218 for progressing users through financial management system content 278 to provide users with one or more financial services 282, according to one embodiment.

The financial management system engine 272 provides the user experience display 276, according to one embodiment. The financial management system engine 272 provides the user experience display 276 to provide users with financial management system content 278 to deliver one or more financial services 282 to the users, according to one embodiment. The financial management system engine 272 populates the financial management system content 278 with selected portions of the user experience options 274, according to one embodiment. The financial management system engine 272 populates the financial management system content 278 with one or more of a variety of the user experience options 274, including, but not limited to, one or more tax topics, questions, content sequences, pages, colors, interface elements, promotions, and other multimedia, according to one embodiment.

The financial management system engine 272 uses the user experience display 276 to both provide the financial management system content 278 and to receive user input data 280, according to one embodiment. The user input data 280 includes user financial data 218, according to one embodiment. The user financial data 218 includes financial and personal information that financial management system 132 uses to provide one or more financial service 282 to the users 294, according to one embodiment.

The financial management system engine 272 or the financial management system 132 uses the user input data 280 (e.g., the user financial data 218) to provide financial services 282 such as, preparing a tax return, managing personal finances, and business management, according to one embodiment.

The financial management system 132 is data that is partially or wholly stored in memory 284 (inclusive of non-volatile memory and volatile memory) and is partially or wholly executed by processors 286, according to one embodiment.

All or part of the customer self-help system 110 is optionally integrated within the financial management system 132 to facilitate the retrieval and sharing of the user financial data 218 or the user profile data 217, according to one embodiment. In one embodiment, portions of the customer self-help system 110 are integrated into the financial management system 132, while the remainder of the customer self-help system 110 operates independently of the financial management system 132. In one embodiment, the financial management system 132 hosts the user experience display 220 (of the customer self-help system 110) while the functionality of the customer self-help system 110 that determines the recency boosted customer support content 128 operates on computing environment resources that are independent of the computing environment resources of the financial management system 132, according to one embodiment.

Although the features and functionality of the production environment 200 are illustrated or described in terms of individual or modularized components, engines, modules, models, databases/data stores, or systems, one or more of the functions of one or more of the components, engines, modules, models, databases/data stores, or systems are functionally combinable with one or more other described or illustrated components, engines, modules, models, databases/data stores, or systems, according to one embodiment.

FIG. 3 is a diagram 300 that shows one technique for determining a relevant topic for search query terms received from a user by including user profile characteristics and user financial data characteristics, according to one embodiment. The diagram 300 also shows a specific illustrative example of applying content relevance weights to topics to increase or decrease the relevance of the topics, at least partially based on content relevance data, according to one embodiment. In other words, the diagram 300 also shows a specific illustrative example of recency boosting topics with the content relevance weights that are determined or defined using content relevance data, according to one embodiment. The diagram 300 includes a search query term input element 302, e.g., a text box, for receiving search query terms (or a question comprising search query terms) from a user, according to one embodiment. The search query term input element 302 is an example of a search query term input element, but other embodiments of search query term input elements (e.g., user interface elements) can be used. The search query term input element 302 includes search query terms entered into the search query term input element 302, according to one embodiment. The example search query terms include a search query term 303, search query term 304, search query term 305, and search query term 306, according to one embodiment. Although four example search query terms are illustrated, many more search query terms or fewer search query terms can also be received and analyzed with the customer self-help system to identify a relevant topic for search query terms, according to one embodiment.

The diagram 300 (of FIG. 3) includes two specific illustrative example entries for the topics database 258 (shown in FIG. 2A) that can be used to determine a topic that is relevant to the search query terms 303, 304, 305, 306, according to one embodiment. The diagram 300 includes a topics database entry 307 and a topics database entry 308, to illustrate an example process of determining a relevant, a more relevant, a highest relevant, or multiple relevant topics for the search query terms 303, 304, 305, 306, according to one embodiment. The topics database entry 307 includes a topic 309, topic terms 310, and topic term probabilities 311, according to one embodiment. The topics database entry 308 includes a topic 312, topic terms combined with context characteristics 313, and topic term probabilities combined with context characteristics probabilities 314, according to one embodiment.

Referring to FIG. 2A and FIG. 3 together, the topics database entries 307 and 308 are examples of entries that are made to the topics database 258 (shown in FIG. 2A), according to one embodiment. The topics 309 and 312 are examples of the topics 260 in the topics database 258, according to one embodiment. The topic terms 310 are examples of topic terms 262 entered into the topics database 258, according to one embodiment. The topic term probabilities 311 are examples of the topic term probabilities 264 entered into the topics database 258, according to one embodiment.

Still referring to FIG. 2A and FIG. 3 together, the topic terms combined with context characteristics 313 are examples of topic terms 262, user profile characteristics 265, and user financial data characteristics 267 entered into the topics database 258, according to one embodiment. The topic term probabilities combined with the context characteristics probabilities 314 are examples of the topic term probabilities 264, the user profile characteristics probabilities 266, and user financial data characteristics probabilities 268 entered into the topics database 258, according to one embodiment. The topics 309 and 312 include a numerical identifier (e.g., topic "18" and topic "19") and an alphabetical identifier (e.g., "INTENT TO CONTACT" topic and "CHANGE/AMEND" topic), according to one embodiment.

Returning to FIG. 3, the topics database entry 308 includes context characteristics of "submitfedreturnpg", "2014deductionscredits", "emplymt_status?Y", "k1form", "incomeexplore", and "TRSversion?free", which represent examples of user profile characteristics and user financial data characteristics that may be stored in a topics database, according to one embodiment. User profile characteristics and user financial data characteristics are examples of context characteristics. For these example context characteristics, "submitfedreturnpg" represents an example of a user experience display identifier for a user experience display page for submitting a federal tax return, "2014deductionscredits" represents an example of a user experience display identifier for a user experience display page for answering questions about deductions and credits for 2014 taxes, "emplymt_status?Y" represents a user financial data characteristic for whether the user is employed, "k1form" represents an example of a user experience display identifier for a user experience display page for filling out a K1 tax form, "incomeexplore" represents an example of a user experience display identifier for a user experience display page for determining income for a user in a tax return preparation system, and "TRSversion?free" is a user profile characteristic that represents whether a user is using a free version of a tax return preparation system, according to one embodiment.

The disclosed customer self-help system determines a topic relevance score 315 for the topic 309 and a topic relevance score 316 for the topic 312 by combining or adding the topic term probabilities and context characteristics probabilities that are associated with one or more of the search query terms 303, 304, 305, 306, the user financial data characteristics, and the user profile characteristics. The disclosed customer self-help system receives the search query terms 303, 304, 305, 306 from the user in the search query term input element 302, according one embodiment. The disclosed customer self-help system searches the topics database entries 307 and 308 for topic terms that match the search query terms 303, 304, 305, 306 and for context characteristics that exist during the submission of the search query terms 303, 304, 305, 306, according one embodiment. The disclosed customer self-help system then associates the topic term probabilities 311, 314 of the topic terms 310, 313 that match the search query terms 303, 304, 305, 306 and search context, to associate the relevant topic term probabilities 311, 314, to the search query terms 303, 304, 305, 306, according one embodiment. For each topic 309 and 312, the disclosed customer self-help system determines the topic relevance scores 315, 316, by combining the topic term probabilities 311, 314 that are relevant to and associated with the search query terms 303, 304, 305, 306, user financial data characteristics, and user profile characteristics that exist in the topics 309, 312.

As a specific illustrative example, if the search query term 303 is the topic term "number", the search query term 304 is the topic term "phone", the search query term 305 is the topic term "PIN", the search query term 306 is the search query term "service", the user profile characteristic 317 includes "submitfedreturnpg", and the user financial data characteristic 320 includes "emplymt_status?Y", then the topic relevance score 315 for the topic 309 is 0.192, and the topic relevance score 316 for the topic 312 is 0.12946, without taking context characteristics into account. If context characteristics are factored into the topic relevance score 316 for the topic 312, then the topic relevance score 316 for the topic 312 increases to 0.30295. Accordingly, the topic relevance score 316 for the topic 312 makes the topic 312—"CHANGE/AMEND" more relevant to the search query terms 303, 304, 305, 306 than the topic 309— "INTENT TO CONTACT", because the topic relevance score 316 is greater than the topic relevance score 315, according to one example of an embodiment.

The diagram 300 includes a content relevance weight 330 and a content relevance weight 332, which are applied to the topic relevance scores 315 and 316 to recency boost (e.g., increase or decrease) the relevance of the topics based on content relevance data received by the customer self-help system, according to one embodiment. Although the topic relevance score 315 is less than (i.e., less relevant than) the topic relevance score 316, applying the content relevance weights 330 and 332 to the topic relevance scores 315 and 316 changes the relevance of the topics 309 and 312. As a specific illustrative example, if the content relevance weight 330 for the topic 309 "INTENT TO CONTACT" has a value of 0.8, then the weighted relevance score 331 of the topic 309 "INTENT TO CONTACT" has a value of 0.1536. Continuing the specific illustrative example, if the content relevance weight 332 for the topic 312 "CHANGE/ AMEND" has a value of 0.4, then the weighted relevance score 333 of the topic 312 "CHANGE/AMEND" has a value of 0.12198. Consequently, weighting the topic relevance scores by the content relevance weights 330 and 332 causes the topic 309 "INTENT TO CONTACT" to have a higher weighted relevance score 331 than the weighted relevance score 333 of the topic 312 "CHANGE/AMEND" (i.e., 0.1536 is greater than 0.12198).

The disclosed customer self-help system determines more relevant, most relevant, or highest relevant topics for the search terms by ranking, sorting, or comparing the topic relevance scores 315, 316 and weighted relevance scores 331, 333 for each of the topics 309, 312, according to one embodiment. The disclosed customer self-help system determines that the topic with the highest weighted relevance score is the highest relevant topic to the search query terms 303, 304, 305, 306, according one embodiment.

Process

Figure 4A:
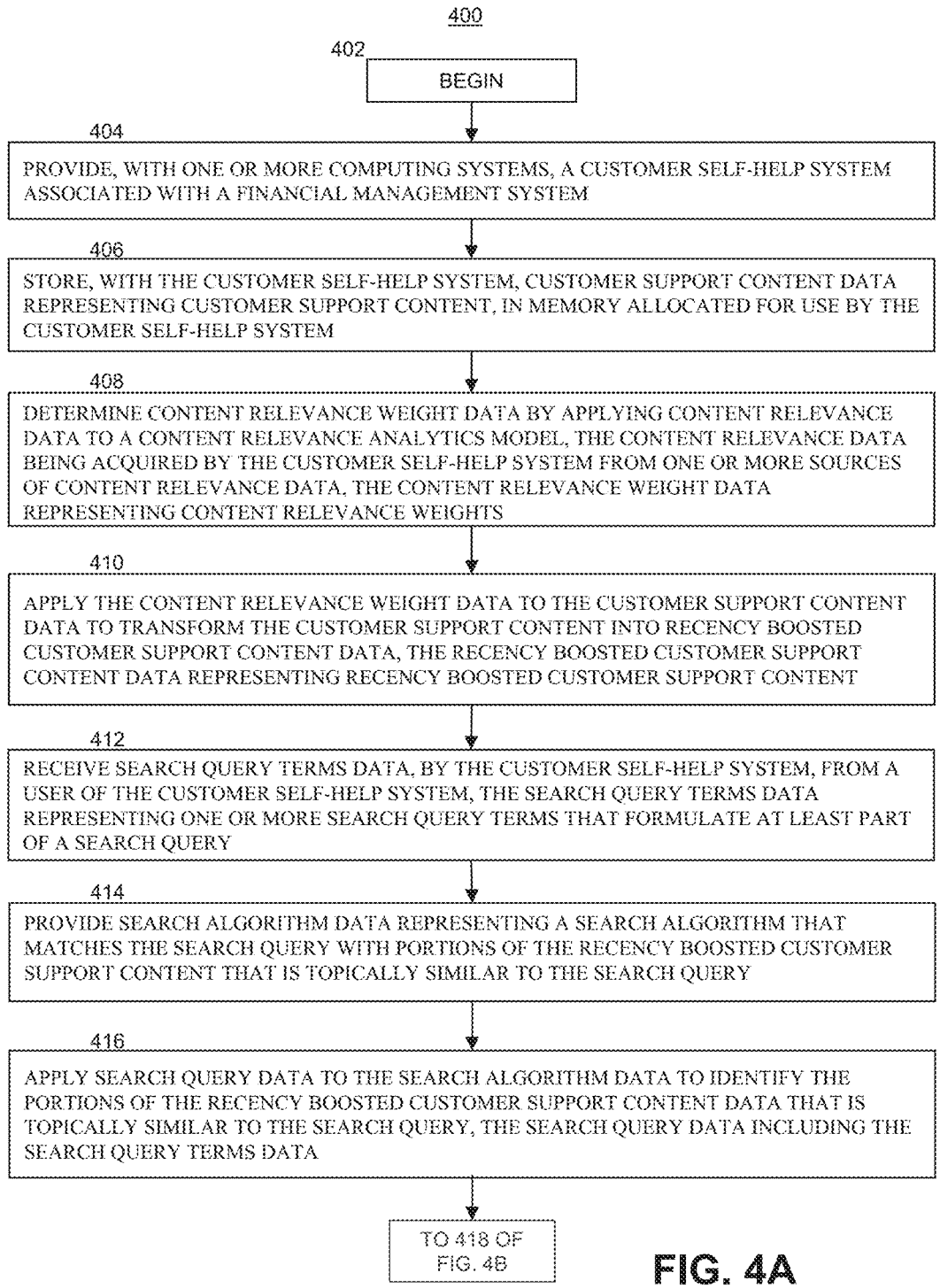
FIGS. 4A and 4B are a flow diagram of a process for improving search results by recency boosting customer support content for a customer self-help system associated with one or more financial management systems, in accordance with one embodiment.
Figure 4B:
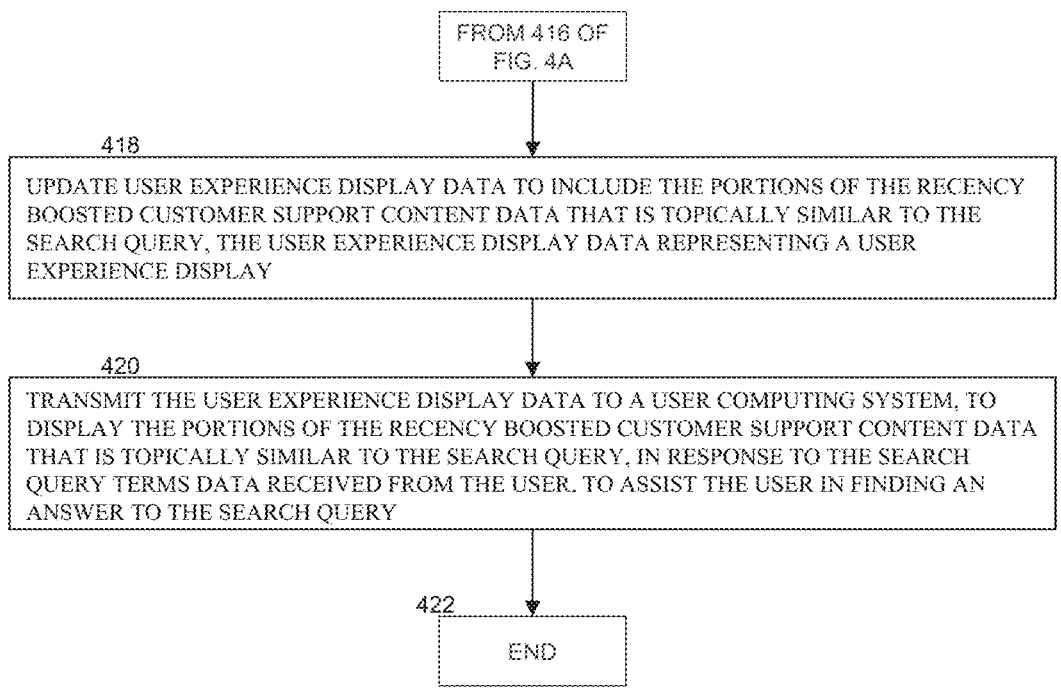

FIGS. 4A and 4B are an example flow diagram of a process 400 for improving search results by recency boosting customer support content for a customer self-help system associated with one or more financial management systems, according to one embodiment.

At operation 402, the process begins, according to one embodiment. Operation 402 proceeds to operation 404, according to one embodiment.

At operation 404, the process provides, with one or more computing systems, a customer self-help system associated with a financial management system, according to one embodiment. Operation 404 proceeds to operation 406, according to one embodiment.

At operation 406, the process stores, with the customer self-help system, customer support content data representing customer support content, in memory allocated for use by the customer self-help system, according to one embodiment. Operation 406 proceeds to operation 408, according to one embodiment.

At operation 408, the process determines content relevance weight data by applying content relevance data to a content relevance analytics model, the content relevance data being acquired by the customer self-help system from one or more sources of content relevance data, the content relevance weight data representing content relevance weights, according to one embodiment. Operation 408 proceeds to operation 410, according to one embodiment.

At operation 410, the process applies the content relevance weight data to the customer support content data to transform the customer support content into recency boosted customer support content data, the recency boosted customer support content data representing recency boosted customer support content, according to one embodiment. Operation 410 proceeds to operation 412, according to one embodiment.

At operation 412, the process receives search query terms data, by the customer self-help system, from a user of the customer self-help system, the search query terms data representing one or more search query terms that formulate at least part of a search query, according to one embodiment. Operation 412 proceeds to operation 414, according to one embodiment.

At operation 414, the process provides search algorithm data representing a search algorithm that matches the search query with portions of the recency boosted customer support content that is topically similar to the search query, according to one embodiment. Operation 414 proceeds to operation 416, according to one embodiment.

At operation 416, the process applies search query data to the search algorithm data to identify the portions of the recency boosted customer support content data that is topically similar to the search query, the search query data including the search query terms data, according to one embodiment. Operation 416 proceeds to operation 418, according to one embodiment.

At operation 418, the process updates user experience display data to include the portions of the recency boosted customer support content data that is topically similar to the search query, the user experience display data representing a user experience display, according to one embodiment. Operation 418 proceeds to operation 420, according to one embodiment.

At operation 420, the process transmits the user experience display data to a user computing system, to display the portions of the recency boosted customer support content data that is topically similar to the search query, in response to the search query terms data received from the user, to assist the user in finding an answer to the search query, according to one embodiment. Operation 420 proceeds to operation 422, according to one embodiment.

At operation 422, the process ends, according to one embodiment.

As noted above, the specific illustrative examples discussed above are but illustrative examples of implementations of embodiments of the method or process for improving search results by recency boosting customer support content for a customer self-help system associated with one or more financial management systems. Those of skill in the art will readily recognize that other implementations and embodiments are possible. Therefore, the discussion above should not be construed as a limitation on the claims provided below.

Improving search results by recency boosting customer support content for a customer self-help system associated with one or more financial management systems is a technical solution to a long standing technical problem of providing irrelevant search results to users, and is not an abstract idea for at least a few reasons. First, improving search results by recency boosting customer support content for a customer self-help system associated with one or more financial management systems is not an abstract idea because it is not merely an idea itself (e.g., can be performed mentally or using pen and paper). Second, improving search results by recency boosting customer support content for a customer self-help system associated with one or more financial management systems is not an abstract idea because it is not a fundamental economic practice (e.g., is not merely creating a contractual relationship, hedging, mitigating a settlement risk, etc.). Third, improving search results by recency boosting customer support content for a customer self-help system associated with one or more financial management systems is not an abstract idea because it is not a method of organizing human activity (e.g., managing a game of bingo). Fourth, although mathematics may be used to generate an analytics model, the disclosed and claimed methods and systems of improving search results by recency boosting customer support content for a customer self-help system associated with one or more financial management systems are not an abstract idea because the methods and systems are not simply a mathematical relationship/formula but are instead techniques for transforming customer support content into data that is more likely to satisfy user search queries.

Improving search results by recency boosting customer support content for a customer self-help system associated with one or more financial management systems is not an abstract idea because the disclosed recency boosting allows for significant improvement to the technical fields of user experience, self-help systems, customer service, customer retention, financial management systems, and domain-specific search engines, according to one embodiment. The present disclosure adds significantly to the field of content searching because the disclosed customer self-help system: increases the likelihood that a user will receive an answer to the user's intended question; increases the likelihood of improving/maintaining a user's trust in the financial management system; and reduces the amount of time users spend searching for customer support content that is relevant to the user's search query, according to one embodiment.

As a result, embodiments of the present disclosure allow for reduced use of processor cycles, memory, and power consumption, by reducing the time spent by users searching for answers among search results and by reducing time spent by users to repeatedly search for an answer to their question in computing environments, according to one embodiment. Consequently, computing and communication systems implementing or providing the embodiments of the present disclosure are transformed into more operationally efficient devices and systems.

In addition to improving overall computing performance, improving search results by recency boosting customer support content for a customer self-help system associated with one or more financial management systems significantly improves the field of financial management systems, by reducing the amount of time it takes to progress a user through financial management tasks (e.g., preparing a tax return) due to delays caused by users' unanswered questions, according to one embodiment. Furthermore, by improving search results by recency boosting customer support content for a customer self-help system associated with one or more financial management systems, the disclosed embodiments help maintain or build trust and therefore loyalty in the financial management system with which the customer self-help system is associated, which results in repeat customers, efficient delivery of financial services, and reduced abandonment of use of the financial management system, according to one embodiment.

In accordance with an embodiment, a computing system implemented method improves search results by recency boosting customer support content for a customer self-help system associated with one or more financial management systems. The method includes providing, with one or more computing systems, a customer self-help system associated with a financial management system, according to one embodiment. The method includes storing, with the customer self-help system, customer support content data representing customer support content, in memory allocated for use by the customer self-help system, according to one embodiment. The method includes determining content relevance weight data by applying content relevance data to a content relevance analytics model, the content relevance data being acquired by the customer self-help system from one or more sources of content relevance data, the content relevance weight data representing content relevance weights, according to one embodiment. The method includes applying the content relevance weight data to the customer support content data to transform the customer support content into recency boosted customer support content data, the recency boosted customer support content data representing recency boosted customer support content, according to one embodiment. The method includes receiving search query terms data, by the customer self-help system, from a user of the customer self-help system, the search query terms data representing one or more search query terms that formulate at least part of a search query, according to one embodiment. The method includes providing search algorithm data representing a search algorithm that matches the search query with portions of the recency boosted customer support content that is topically similar to the search query, according to one embodiment. The method includes applying search query data to the search algorithm data to identify the portions of the recency boosted customer support content data that is topically similar to the search query, the search query data including the search query terms data, according to one embodiment. The method includes updating user experience display data to include the portions of the recency boosted customer support content data that is topically similar to the search query, the user experience display data representing a user experience display, according to one embodiment. The method includes transmitting the user experience display data to a user computing system, to display the portions of the recency boosted customer support content data that is topically similar to the search query, in response to the search query terms data received from the user, to assist the user in finding an answer to the search query, according to one embodiment.

In accordance with an embodiment, a computing system implemented method improves search results by recency boosting customer support content for a customer self-help system associated with one or more financial management systems. The method includes providing, with one or more computing systems, a customer self-help system associated with a financial management system, according to one embodiment. The method includes storing, with the customer self-help system, customer support content data representing customer support content, in memory allocated for use by the customer self-help system, according to one embodiment. The method includes acquiring, with the customer self-help system, content relevance from one or more sources of content relevance data, according to one embodiment. The method includes determining content relevance weight data by applying the content relevance data to a content relevance analytics model, the content relevance weight data representing content relevance weights, the content relevance analytics model being at least partially based on a probabilistic topic model, according to one embodiment. The method includes applying the content relevance weight data to the customer support content data to transform the customer support content into recency boosted customer support content data, the recency boosted customer support content data representing recency boosted customer support content, according to one embodiment. The method includes receiving search query terms data, by the customer self-help system, from a user of the customer self-help system, the search query terms data representing one or more search query terms that formulate at least part of a search query, according to one embodiment. The method includes providing search algorithm data representing a search algorithm that matches the search query with portions of the recency boosted customer support content, at least partially based on topics that are common to both the search query and the portions of the recency boosted customer support content, according to one embodiment. The method includes applying search query data to the search algorithm data to identify the portions of the recency boosted customer support content data that topically related to the search query, the search query data including the search query terms data, according to one embodiment. The method includes updating user experience display data to include the portions of the recency boosted customer support content data that are topically related to the search query, the user experience display data representing a user experience display, according to one embodiment. The method includes transmitting the user experience display data to a user computing system, to display the portions of the recency boosted customer support content data that are topically related to the search query, in response to the search query terms data received from the user, to assist the user in finding an answer to the search query, according to one embodiment.

In accordance with an embodiment, a system increases a likelihood of providing relevant search results by recency boosting customer support content for a customer self-help system associated with one or more financial management systems. The system includes one or more processors and memory, according to one embodiment. The memory includes instructions which, if executed by the one or more processors, cause the one or more processors to perform a process for improving search results by recency boosting customer support content for a customer self-help system associated with one or more financial management systems, according to one embodiment. The process includes providing, a customer self-help system associated with a financial management system, according to one embodiment. The process includes storing, with the customer self-help system, customer support content data representing customer support content, in memory allocated for use by the customer self-help system, according to one embodiment. The process includes determining content relevance weight data by applying content relevance data to a content relevance analytics model, the content relevance data being acquired by the self-help system from one or more sources of content relevance data, the content relevance weight data representing content relevance weights, according to one embodiment. The process includes applying the content relevance weight data to the customer support content data to transform the customer support content into recency boosted customer support content data, the recency boosted customer support content data representing recency boosted customer support content, according to one embodiment. The process includes receiving search query terms data, by the customer self-help system, from a user of the customer self-help system, the search query terms data representing one or more search query terms that formulate at least part of a search query, according to one embodiment. The process includes providing search algorithm data representing a search algorithm that matches the search query with portions of the recency boosted customer support content that is topically similar to the search query, according to one embodiment. The process includes applying search query data to the search algorithm data to identify the portions of the recency boosted customer support content data that is topically similar to the search query, the search query data including the search query terms data, according to one embodiment. The process includes updating user experience display data to include the portions of the recency boosted customer support content data that is topically similar to the search query, the user experience display data representing a user experience display, according to one embodiment. The process includes transmitting the user experience display data to a user computing system, to display the portions of the recency boosted customer support content data that is topically similar to the search query, in response to the search query terms data received from the user, to assist the user in finding an answer to the search query, according to one embodiment.

In the discussion above, certain aspects of one embodiment include process steps or operations or instructions described herein for illustrative purposes in a particular order or grouping. However, the particular order or grouping shown and discussed herein are illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein do not limit the scope of the invention as claimed below.

As discussed in more detail above, using the above embodiments, with little or no modification or input, there is considerable flexibility, adaptability, and opportunity for customization to meet the specific needs of various users under numerous circumstances.

In the discussion above, certain aspects of one embodiment include process steps or operations or instructions described herein for illustrative purposes in a particular order or grouping. However, the particular order or grouping shown and discussed herein are illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method performed by one or more processors of a customer self-help system, the method comprising:
   determining content relevance weights for customer support content based at least in part on application of content relevance data to a content relevance analytics model;
   determining topic term probabilities for topic terms assigned to portions of the customer support content;
   receiving, from a user of the customer self-help system, one or more search query terms that formulate at least part of a search query;
   determining context characteristics associated with the user concurrently with receiving the one or more search query terms, the context characteristics comprising user financial data characteristics and user profile characteristics;
   determining a probabilistic relationship between topics and the user context characteristics;
   identifying portions of the customer support content that are topically related to the search query based on at least a portion of the one or more search query terms;
   determining topic relevance scores for customer support content associated with the search query based on a combination of the topic term probabilities and the probabilistic relationship between the topics and the user context characteristics;
   determining weighted relevance scores for customer support content associated with the search query by multiplying the topic relevance scores with the content relevance weights associated with the customer support content; and
   transforming the customer support content into recency boosted customer support content based on application of the weighted relevance scores to the customer support content.

2. The method of claim 1, wherein the customer self-help system is associated with a financial management system comprises one of a tax return preparation system, a business financial management system, or a personal financial management system.

3. The method of claim 1, wherein the search algorithm includes an analytics model comprising a probabilistic topic model.

4. The method of claim 3, wherein the probabilistic topic model is configured to determine a topic relevance between the customer support content and the one or more search query terms based at least in part on identifying topics associated with each content entry of the customer support content and identifying topics associated with the one or more search query terms.

5. The method of claim 1, further comprising:
   updating user experience display data to include portions of the recency boosted customer support content that are topically related to the search query; and
   transmitting the updated user experience display data to a user computing system.

6. The method of claim 1, further comprising:
   maintaining financial information for users of the financial management system; and
   maintaining user profiles for users of the financial management system, wherein the search query data includes the user profile data and the user financial data.

7. The method of claim 1, further comprising:
   determining topic relevance scores for topics associated with the customer support content;
   sorting the topic relevance scores; and
   selecting portions of the customer support content that are topically relevant to the search query.

8. The method of claim 1, wherein the content relevance data comprises electronic media feeds retrieved from one or more sources of content relevance data, and the method further comprises applying contents of the electronic media feeds to a probabilistic topic model to determine topics of the electronic media feeds.

9. The method of claim 8, further comprising:
   ranking the topics of the electronic media feeds by prevalence; and
   defining content relevance weight data for the topics of the electronic media feeds based at least in part on the topic rankings.

10. The method of claim 1, wherein the search algorithm comprises a predictive model trained using one of a regression, logistic regression, decision trees, artificial neural networks, support vector machines, linear regression, nearest neighbor methods, distance based methods, naive Bayes, linear discriminant analysis, or k-nearest neighbor algorithm.

11. A customer self-help system, comprising:
    a database;
    one or more processors; and
    a memory storing instructions that, when executed by the one or more processors, causes the customer self-help system to perform operations comprising:
       determining content relevance weights for customer support content based at least in part on application of content relevance data to a content relevance analytics model;
       determining topic term probabilities for topic terms assigned to portions of the customer support content;
       receiving, from a user of the customer self-help system, one or more search query terms that formulate at least part of a search query;
       determining context characteristics associated with the user concurrently with receiving the one or more search query terms, the context characteristics comprising user financial data characteristics and user profile characteristics;
       determining a probabilistic relationship between topics and the user context characteristics;
       identifying portions of the customer support content that are topically related to the search query based on at least a portion of the one or more search query terms;
       determining topic relevance scores for customer support content associated with the search query based on a combination of the topic term probabilities and the probabilistic relationship between the topics and the user context characteristics;
       determining weighted relevance scores for customer support content associated with the search query by multiplying the topic relevance scores with the content relevance weights associated with the customer support content; and transforming the customer support content into recency boosted customer support content based on application of the weighted relevance scores to the customer support content.

12. The customer self-help system of claim 11, wherein the customer self-help system is associated with a financial management system comprises one of a tax return preparation system, a business financial management system, or a personal financial management system.

13. The customer self-help system of claim 11, wherein the search algorithm includes an analytics model comprising a probabilistic topic model.

14. The customer self-help system of claim 13, wherein the probabilistic topic model is configured to determine a topic relevance between the customer support content and the one or more search query terms based at least in part on identifying topics associated with each content entry of the customer support content and identifying topics associated with the one or more search query terms.

15. The customer self-help system of claim 11, wherein execution of the instructions causes the customer self-help system to perform operations further comprising:
updating user experience display data to include portions of the recency boosted customer support content that are topically related to the search query; and
transmitting the updated user experience display data to a user computing system.

16. The customer self-help system of claim 11, wherein execution of the instructions causes the customer self-help system to perform operations further comprising:
maintaining financial information for users of the financial management system; and
maintaining user profiles for users of the financial management system, wherein the search query data includes the user profile data and the user financial data.

17. The customer self-help system of claim 11, wherein execution of the instructions causes the customer self-help system to perform operations further comprising:
determining topic relevance scores for topics associated with the customer support content;
sorting the topic relevance scores; and
selecting portions of the customer support content that are topically relevant to the search query.

18. The customer self-help system of claim 11, wherein the content relevance data comprises electronic media feeds retrieved from one or more sources of content relevance data, and the method further comprises applying contents of the electronic media feeds to a probabilistic topic model to determine topics of the electronic media feeds.

19. The customer self-help system of claim 18, wherein execution of the instructions causes the customer self-help system to perform operations further comprising:
ranking the topics of the electronic media feeds by prevalence; and
defining content relevance weight data for the topics of the electronic media feeds based at least in part on the topic rankings.

20. The customer self-help system of claim 11, wherein the search algorithm comprises a predictive model trained using one of a regression, logistic regression, decision trees, artificial neural networks, support vector machines, linear regression, nearest neighbor methods, distance based methods, naive Bayes, linear discriminant analysis, or k-nearest neighbor algorithm.

* * * * *